United States Patent
Rao et al.

(10) Patent No.: US 9,083,763 B2
(45) Date of Patent: Jul. 14, 2015

(54) SOCIAL NETWORKING SYSTEM

(75) Inventors: Sunil K. Rao, Palo Alto, CA (US);
Raman K. Rao, Palo Alto, CA (US);
Rekha K. Rao, legal representative, Palo Alto, CA (US)

(73) Assignee: IP Holdings, Inc., Palo Alto, CA (US)

( * ) Notice: Subject to any disclaimer, the term of this patent is extended or adjusted under 35 U.S.C. 154(b) by 0 days.

(21) Appl. No.: 13/472,390

(22) Filed: May 15, 2012

(65) Prior Publication Data

US 2012/0290659 A1 Nov. 15, 2012

Related U.S. Application Data

(63) Continuation of application No. 12/982,805, filed on Dec. 30, 2010, now Pat. No. 8,234,346, which is a continuation of application No. 10/644,276, filed on Aug. 20, 2003, now Pat. No. 7,890,581.

(51) Int. Cl.
| | |
|---|---|
| G06F 15/16 | (2006.01) |
| H04L 29/08 | (2006.01) |
| G06Q 30/08 | (2012.01) |
| H04W 8/18 | (2009.01) |

(52) U.S. Cl.
CPC ............. *H04L 67/306* (2013.01); *G06Q 30/08* (2013.01); *H04L 67/16* (2013.01); *H04W 8/18* (2013.01)

(58) Field of Classification Search
CPC ...... G06Q 50/01; H04L 51/32; H04L 67/306; H04L 12/588; H04L 41/147
See application file for complete search history.

(56) References Cited

U.S. PATENT DOCUMENTS

| | | |
|---|---|---|
| 4,418,333 A | 11/1983 | Schwarzbach et al. |
| 4,465,401 A | 8/1984 | Stoddord et al. |
| 4,503,288 A | 3/1985 | Kessler |
| 4,675,653 A | 6/1987 | Priestley |
| 4,918,723 A | 4/1990 | Iggulden et al. |
| 5,163,081 A | 11/1992 | Wycherley et al. |
| 5,195,130 A | 3/1993 | Weiss et al. |
| 5,212,638 A | 5/1993 | Bernath |
| 5,379,341 A | 1/1995 | Wan |
| 5,410,738 A | 4/1995 | Diepstraten et al. |
| 5,465,401 A | 11/1995 | Thompson |
| 5,513,242 A | 4/1996 | Mukerjee et al. |
| 5,517,553 A | 5/1996 | Sato |
| 5,539,391 A | 7/1996 | Yuen |
| 5,555,258 A | 9/1996 | Snelling et al. |

(Continued)

FOREIGN PATENT DOCUMENTS

WO   WO 92/03884   3/1992

*Primary Examiner* — Djenane Bayard
(74) *Attorney, Agent, or Firm* — Levine Bagade Han LLP

(57) ABSTRACT

A matching network system including communication devices, servers and software which enables the provisioning of services and execution of transactions based on a plurality of private and public personality profiles and behavior models of the users, of the communication devices, of the products/services and of the servers; in combination with the software resident at the communication device level and or the local/network server level. Matching and searching processes based on a plurality of personality profiles wherein the information, communication and transactions are enabled to be matched with the user, the communication device and or the servers. The communication device is a stationary device or a mobile device, such as a portable computing device, wireless telephone, cellular telephone, personal digital assistant, or a multifunction communication, computing and control device.

21 Claims, 14 Drawing Sheets

(56) References Cited

U.S. PATENT DOCUMENTS

| | | |
|---|---|---|
| 5,559,794 A | 9/1996 | Willis et al. |
| D374,675 S | 10/1996 | Sakai et al. |
| 5,565,929 A | 10/1996 | Tanaka |
| 5,566,205 A | 10/1996 | Delfine |
| 5,577,118 A | 11/1996 | Sasaki et al. |
| 5,874,939 A | 2/1999 | Galvin |
| 5,974,413 A | 10/1999 | Beauregard et al. |
| 6,169,789 B1 | 1/2001 | Rao et al. |
| 6,438,545 B1 | 8/2002 | Beauregard et al. |
| 6,480,587 B1 | 11/2002 | Rao et al. |
| 6,560,235 B1 | 5/2003 | Jones |
| 6,601,103 B1 | 7/2003 | Goldschmidt et al. |
| 7,069,308 B2 | 6/2006 | Abrams |
| 7,890,581 B2 | 2/2011 | Rao et al. |
| 2002/0040310 A1 | 4/2002 | Lieben et al. |
| 2002/0052873 A1 | 5/2002 | Delgado et al. |
| 2002/0194334 A1 | 12/2002 | Focant et al. |
| 2003/0004782 A1 | 1/2003 | Kronby |
| 2003/0014373 A1 | 1/2003 | Perge et al. |
| 2003/0087652 A1 | 5/2003 | Simon et al. |
| 2003/0217106 A1 | 11/2003 | Adar et al. |
| 2004/0068447 A1 | 4/2004 | Mao et al. |
| 2008/0133716 A1 | 6/2008 | Rao et al. |
| 2011/0161279 A1 | 6/2011 | Rao et al. |
| 2012/0277998 A1* | 11/2012 | Bevilacqua et al. ............ 702/19 |
| 2013/0097144 A1* | 4/2013 | Siamwalla et al. ........... 707/706 |

* cited by examiner

SOCIAL NETWORKING SYSTEM

CROSS-REFERENCE TO RELATED APPLICATIONS

The present application is a continuation of U.S. application Ser. No. 12/982,805 filed Dec. 30, 2010, now U.S. Pat. No. 8,234,346, which is a continuation of U.S. application Ser. No. 10/644,276 filed Aug. 20, 2003, now U.S. Pat. No. 7,890,581, issued Feb. 15, 2011.

BACKGROUND OF THE INVENTION

In the prior art the user of a stationary or mobile device is forced to search the Internet in a laborious, time consuming and inefficient manner to find individuals or groups of individuals that meet the user's pre-set or dynamically changing criteria for one or more types of social, professional or other interactions. Similarly, the user faces a daunting task in efficiently searching for web sites, relevant web content and specific information. The simple reason for this limitation is that the prior processes and the prior art is quite simply search oriented rather than match oriented. There is a distinct difference in the processes related to searching and the processes related to matching. The search process, of the prior art, is essentially user agnostic and delivers the same results to one or more users based on a specific query. The search process of the prior art is driven by the mere presence of key words within a web page and ranking based on how often the web page has been indexed by other web sites and accessed. The search process does not apply a personality profile paradigm to the user or the data. Additionally the user does not wish to reveal the personal details to the Website or the Search Site nor are these web sites and search sites empowered by various current and anticipated laws which are designed to protect the privacy of the user and limit the potential for identity theft. Another limitation of the search process is that it is unidirectional and not bi-directional with the search engine having at best limited information about the user. The present invention enables the application of personality profiles, while protecting the privacy or the user, by enabling the user to be in complete control.

The present invention discloses and teaches a novel Matching Network system and associated search and match processes that enhance user control, enabling the user to maintain one or more private and public personality profiles. The personality profiles can be held as personality states, such personality states being static, dynamic or fixed for a finite period of time. These personality profiles/states define the user's criteria for one or more types of social, professional or commerce transactions. The match process is bi-directional at a minimum or omni directional at the outside. The matching of the personality profiles of two or more parties to the transaction is executed utilizing the user defined rules and a Rules Processor that resides within the Match Engine. The ability to maintain multiple personality profiles/states is equally applicable to individuals, web sites, web pages, products and or services enabling micro and macro matching based on one or more rules. This novel feature enables the individuals and web sites to have behavioral patterns and is termed in this invention as the Behavioral Web or the Behavioral Internet.

In addition, the prior art does not allow a user to maintain anonymity at one or more stages of various transactions. There is a need to maintain anonymity and disclose true identity and or intent at the appropriate time based on negotiation and the progress of various transactions. A user also desires to maintain a plurality of public and private personality states based on the type asocial, professional or commercial transactions. In the system level scheme described herein the individual users, the individual web sites, the individual web pages or subsets of a web page are enabled to have multiple private and or public personality states that cause the web to behave in a more responsive manner that better matches the user's needs. A network system for mobile matching is disclosed that enables efficient matching of one or more of the user's requests, enabling the user to maintain multiple public and private personality states, enabling the user to maintain anonymity as desired for the entire transaction or part of a transaction, for a specified duration or till a specified condition is fulfilled. The system enables the user a means to negotiate a relationship and or a transaction using an Intelligent Keyboard and or a like function Mobile Device, a local and or network server; and or an Escrow Server located in an inside or outside wired or wireless communication line path.

SUMMARY OF THE INVENTION

It is an object of the present invention to provide a novel scheme by which the limitations of the current World Wide Web, the Internet and Search Engines are overcome to enable personalized Web and Internet experience matching the individual's personality profiles. The prior art Search Engine technology simply catalogs and ranks the web sites and or web content based on rule and algorithms that are not specific to the individual user. In the prior art when a user A desires to search for a specific web site or web content and another user B similarly performs a search, the results delivered by the search engine to all the users are identical, even though the personality, location and intended applications of user A and user B are quite different.

It is an object of the present invention to enable a single user to maintain a plurality of personality profiles or personality states to enable the user to efficiently traverse the Internet and or the Intranet to obtain the desired information that matches the user's needs. The prior art has limited capability to gather and maintain the user information such as the name, address and credit card information to facilitate certain transactions with ease. However, the prior art method does not provide an insight into the personality profiles, states and behavior of the individual user or the needs of the user at any given time. The prior art method does not provide a match to the user's needs without the user having to laboriously shift and select information from a long list of relevant and irrelevant data that is simply presented to him as a result of a search process.

It is an object of the present invention to enable the information provider or service provider that maintains a website, web page or subset of a web page to maintain a plurality of personality profiles or personality states for each of the web sites, web pages and sub sets of a web page. In the prior art any website, web page or subset of a web page has the same content when viewed by more than one individual and or the same functionality for all of the users. In the prior art, the web site content nor the functionality is specifically matched to the individual user.

It is an object of the current invention to enable a web site having itself a plurality of personality profiles and states to recognize and respond appropriately to each individual user that also has a plurality of personality profiles in order to match the user's request for information or services. In the prior art, there is no ability for a web site or an individual user to maintain a plurality of personalities and for efficient recognition and matching.

It is an object of the current invention to enable mathematical and behavioral modeling of one or more users as individuals, in groups or in the aggregate in order to establish one or more personality states for the web site, web page and or sub set of a web page. In the prior art web sites do not have multiple personalities nor do they model themselves or model their users with a user personality profile.

It is an object of the current invention to enable the implementation and the structuring of a web site, web page or sub set of a web page as a finite state machine to form the Behavioral Web. The novel method of structuring a web site as a finite state machine causes the web site to behave in a manner that is specific to each user and respond appropriately to the stimuli generated by each individual user. This novel method enables personalized content to be viewed and tailors the functionality of the web site to a specific user. In the prior art, web sites do not maintain the state for the web pages on the web site, depending on the actions on a specific page. The novel finite state machine design as disclosed herein maintains the state for all of the web pages per individual user since stimuli on one page may cause a state change on some other page. This novel implementation is based upon personality profiles, user modeling, user defined criteria, state-ful user profiles, and computer heuristics.

It is an object of the present invention to enable a web site having a plurality of personalities to recognize and respond to the specific personality of a user and transform the web site and the functionality in a manner that is specific for that user. This novel approach enables a single web site to be responsive to multiple users and their personality profiles to enable the provider to efficiently deliver matched content and matched services to a plurality of the user's on the Internet and or the Intranet. The current invention enables the web site to behave in a personalized manner for each individual user.

It is an object of the present invention to define a match engine which enables behavioral modeling and matching of Users and Providers on the Internet. The Match Engine is of utility to the World Wide Web application as well as other applications, where user modeling and user behavior are factors. The user is in this instance defined as either a human or a computer, since the modeling is also applicable for computer to computer interactions and negotiation. The Match Engine also enables user's to intelligently sift through the vast amount of behavioral content to derive information that matches the user's needs. This operation of intelligently sifting through behavioral content and zeroing in on relevant information is defined as matching. Matching is a super-set of searching and enables customized access to information.

It is an object of the current invention to utilize the Match Engine for matching by enabling the input and output data sets to be characterized and modeled according to personality profiles, user defined criteria, state-ful profiles of the user, and computer based heuristics. The matching process becomes a search process if the user is not modeled and or the data set itself does not behave. Behavior modeling of one or more parties to the transaction, and delivering the relevant data from the entire data set to one or more parties defines a matching process.

It is an object of the current invention to utilize the Match Engine for matching, enabling the user to have a richer web experience as well as a more granular, targeted access to information. In the prior art of searching the data set is not personified and modeled. In contrast, in matching, behavioral models of entire web sites or inanimate objects are developed. One or more attributes of the object are defined as personalities allowing these inanimate objects to be modeled and matched with real live human beings or computers depending on the application.

It is an object of the present invention to make the web experience of the user simpler and richer, replacing and or augmenting the search process by a match process utilizing the Match Engine. The World Wide Web is an interconnected graph in which the nodes are web pages and links serve as the edges between these nodes. In the current state of the art, searching engines scour the web and employ their own algorithm to catalog the web. Some search engines suggest that the more often a web page is linked by other web pages the greater its relevance. Users enter their query/criteria into search engines and using the criteria and its own algorithms the search engine produces a series of web pages that it determines are relevant to the user. Searching is by definition is a user intensive process. The user must sift through the results displayed by the search engine. Filters may be applied to the search criteria by specifying Boolean logic to tie the criteria together. The web pages that are searched are not customized and do not behave in a personalized manner. Therefore, the search engine indexes relatively static data while the web is inherently capable of providing a dynamic experience with the emerging technologies which enable connectivity all the time.

It is an object of the current invention to enable multiple user profiles in the matching operation. The prior art search engine technology does not use personality models to understand the user. Prior art searching techniques do not incorporate a user's past queries to predict future needs. However, even if it did that, it still does not develop a user personality profile or a more global user model. Since no user profile exists in traditional searching, the search engine does not perform keyword look-ups based upon a user profile. Further, multiple profiles are not used in the searching operation.

It is an object of the current invention to enable efficient traversing of the behavioral web with the Matching Network system infrastructure, wherein a user assumes a persona via one or more personality profiles. The personality profiles of the user can be stored at the client on the user's browser. Alternatively, the persona can be assumed at the specific web site using a selected personality profile. The user modeling information is also aggregated from the client, server, and or third parties. Upon assuming this persona that is transmitted to web sites, web sites may customize their content according to the persona. Web sites are therefore capable of leveraging the behavioral web to present a different face to the various users that visit their site. Additionally, the web sites behave differently depending on the actions of the user and changes to his persona. The Match Engine's matching program enables users to derive relevant information from this behavioral web.

In an embodiment of the present invention, the Matchbot assumes the user specified persona to scour the web looking for relevant matching web sites and content. The Matchbot is defined as a robot that is configured for information acquirement to enable searching and matching based on personality profiles of the user. The Matchbot working in conjunction with the Match Engine enable much more customized and relevant information to be acquired by the user. The User has the option of assuming a variety of personas.

In another object of the present invention, Web sites, vendors and service providers are enabled to continuously or at set intervals launch Matchbots that embody specific personalities and objectives of the provider to reach and match with the Matchbots of the users.

In an embodiment of the present invention, Matchbots that assume the user specified personality profile scour the web continuously or for a specified time. Additionally the Matchbots have the capability to be time released and or have a limit condition in which the matching operation should take place. The Matchbots are programmable for one or more personalities and one or more specific tasks.

In another embodiment of the present invention the Match Engine is programmable by the user to define the criteria that constitutes a match. That is the user can set one or more criteria for matching and assign weights to each criterion. The Matchbot scours the web based on these defined criteria and determine the relevancy of the information at the Matchbot level and or in conjunction with the Match Engine to determine if a match has occurred.

In another object of the present invention through the use of targeted Matchbots, marketing and electronic commerce by the vendor is enabled, without the vendor having to resort to spamming of all users, unsolicited e-mail, pop advertisements and other intrusive behavior. The Matchbot released by the Vendor is recognized by the user's web site or the user's Matchbot based on the rules that the user has established for one or more of his personalities. Additionally, the Matchbot concept for the Internet ensures that nothing that is unsolicited is delivered to a user's mobile device or a stationary device since all information that is delivered is via the user's own Matchbot, said user Matchbot enabled to behave according to the user defined rules. The Matchbot concept and system level scheme ensures that nothing is pushed on to the user, it based on a Match and Pull concept rather than the prior art standard of unmatched and unwanted Push concept.

In another embodiment of the present invention the Match Engine enables the discovery of user profiles/wireless devices/intelligent Appliances to enable appropriate service offering by the wireless service provider.

In another embodiment of the present invention the Match Engine enables the discovery and use of wired or wireless applications that are best suited and matched to the user's personality profile.

In another embodiment, the Match Engine enables adaptable wireless networking applications for mobile devices and intelligent appliances based on personality profiles.

In another embodiment of the present invention the Match Engine enables the discovery and use of wired or wireless applications that are best suited and matched to the user on one or more communication channels.

In another embodiment of the present invention the Match Engine enables the matching of one or more individuals for the purposes of social and professional interaction.

In another embodiment of the present invention the Match Engine enables the individual user to maintain a plurality of public and private personalities. The Match Engine enables the appropriate matching of the user based on one or more personalities depending on the privacy needs and other criteria.

In another embodiment of the present invention the Match Engine enables the individual user to maintain a plurality of public and private personalities and negotiate social, professional or commercial relationships and execute transactions based on a selected personality profile and the desired level of privacy and security.

In another embodiment of the present invention, multiple Match Engines with varying degrees of capabilities and personalization are enabled to exist at the communication device level, the local server level, the network sever level and on the Internet. This system configuration provides matching capabilities across the entire network topology.

In another embodiment of the present invention, the Match Engine and Search Engine are enabled to co-exist at the mobile device level, at the local server level and or on the network to perform matching and searching in a stand alone manner and or in conjunction with each other.

In another embodiment of the present invention, the match process is applied to the numerous results of a search provided by a Search Engine, in order to refine and derive a match that meets the user profile.

It is an object of the present invention to mask the email identity of the user by utilizing an Escrow Server for send and receive e-mail functionality and other transactions. The Escrow Server is enabled to be part of the Match Engine and or be external to the Match Engine on a local loop or network loop.

An object of the present invention is to enable matching by acquiring the user's match criteria through a text based entry and associated Boolean logic. This in addition is coupled with a series of questions and answers provided by the user initially and or subsequently to narrow the match criteria. These questions which relevant to the user are generated based upon prior history, similar queries by other users, contextual awareness and computer defined heuristics.

An object of the present invention is to model the user to perform efficient matching. The user creates a personality profile and or multiple personality profiles some of which are private and some are public.

An object of the present invention is to enable a model of the data set for efficient matching. Even if the data set is inanimate, it is profiled with a personality test consisting of various attributes of the inanimate entity so that it demonstrates various behaviors.

An object of the present invention is to enable matching via the use of algorithms that catalog the web. These algorithms determine the relevance of a web page by the number of links that point to that web page. In addition these algorithms depend on meta data to determine relevance.

An object of the present invention is to continuously refine the models of the users based on computer defined heuristics such as Baysien prior history and refine the relevance rankings of web pages based on user feedback. The user feedback is actively determined through feedback tests taken by the user and passively determined through assessing the type of web pages, how many web pages, and how often web page have been selected by the user.

By building more accurate models of users, the Matching Engine leverages the fact that similar types of users desire similar types of web results.

An object of the present invention is to enable dynamic matching. Matching is not static as is the case currently with searching. A match is capable of being queried instantaneously and or polled at a time frequency defined by the user.

An object of the present invention is to enable dynamic searching. The search process via a Search Engine is capable of being queried instantaneously and or polled at a time frequency defined by the user. Currently this capability does not exist except for instantaneous searching.

An object of the present invention is to enable context based and mobility based matching.

An object of the present invention is to enable finite state machine logic to be used to model the behavior of individuals, groups, web sites, products, services and inanimate objects.

Other objects, features and advantages of the present invention will become apparent from the following detailed description when taken in conjunction with the accompanying drawings.

BRIEF DESCRIPTION OF SEVERAL VIEWS OF THE DRAWING

The accompanying drawings, being incorporated in and forming a part of this specification, illustrate embodiments of the invention and, together with the description, serve to explain the principles of the present invention.

DETAILED DESCRIPTION OF THE DRAWINGS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The present invention provides means for a User to readily assume a plurality of public and private personalities for navigating the Intranet or the Internet. The present invention in addition enables the Web Site to assume a plurality of personalities for serving the unique needs of different users. The present invention also discloses the means for describing any product or service with a plurality of personality type attributes. The present invention discloses novel methods for maintaining either anonymity or a public presence based on User preferences. In addition, the present invention teaches the method for negotiating different types of transactions through the use of the Escrow Server.

The present invention additionally provides the means for the user to develop, the User Behavioral Model, based on the personality profiles of the user and prior history of the user to predict future behavior of the user. Similarly, the present invention enables modeling of other users based on their personality profile and past interactions. The present invention also provides the means for the website to develop, the Website Behavioral Model, based on the personality profiles of the website and prior history of the website to predict future behavior of the website as it serves the requests of varied users. The present invention enables private and public groups with the groups being characterized by one or more private and public personalities and the Group Behavioral Model.

The present invention also discloses a novel method for enabling the matching of the User with various types of information, services and products desired by the user, through match based solutions that are user specific, personality specific and transaction specific. The Match Engine based techniques disclosed in the present invention overcome the limitations of the Search Engine based techniques. The present invention discloses means for efficiently matching the User by utilizing behavioral models and algorithms at the User node, the Web Site node or the full spectrum of the Internet. In addition, the present invention enables the user to employ exclusively either, the Match techniques, the Search techniques and or a combination of Search and Match techniques based on the user discretion.

Figure 1:
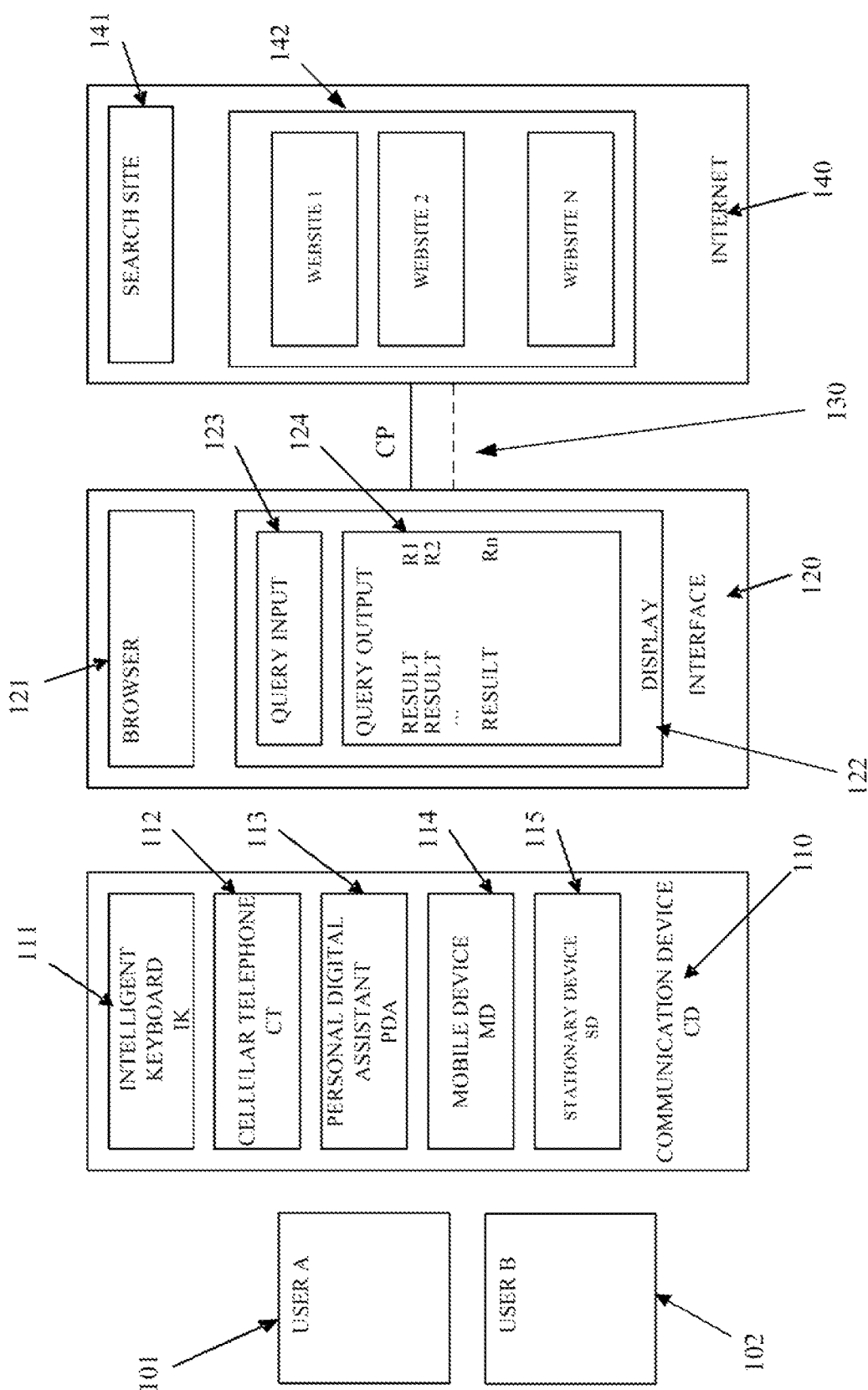
FIG. 1 shows the network topology of the prior art showing the means for searching for information by one or more users utilizing the Internet and one or more communication devices.

FIG. 1: FIG. 1 is a description of the prior art, illustrating a User A, 101 and User B 102, utilizing one of many enabling Communication Devices 110, such as the Intelligent keyboard III, Cellular Telephone 112, Personal Digital Assistant 113, Mobile Device 114, and Stationary Device 115. The devices having an Interface 120 that consists of a Browser 121, Display 122 to facilitate navigation of the Internet. The Interface also consists of means for Query Input 123 and means for Query Output 124. The communication device connects to the Internet 140 via wired or wireless communication path, CP, 130. The User is enabled to search for information from Search Site 141 located on the Internet and execute transactions with one or more Web Sites 142 located on the Internet. The prior art has a number of limitations that are herein illustrated with examples to clearly contrast the prior art with the novel features of the present invention that serve to overcome these limitations and provide enhanced utility for the user.

In the prior art, the User A, 101 has no specific Internet personality and by default has a generic persona that is essentially the same as millions of other users, including User B, 102. After being connected to the Internet 140, by wired or wireless means 130, the user logs onto a Search Site 141 located on the Internet. Utilizing the Interface 120, the Browser 121, the user performs a Query Input 123 in Display window 122 seeking specific information. The Search Site internally employs a search engine that operates via algorithms that are search engine specific rather than user specific to deliver Query Output 124 which consists of a number of results R1 through Rn. In the prior art the behavioral modeling of users, groups and websites is not possible as there is no means for characterizing these entities.

EXAMPLE 1.1

With the amount of data available on the Internet growing exponentially, the user is faced with a daunting task that may be compared to the proverbial process of looking for a needle in a haystack.

Let us assume that a number of users are searching the Internet for information on needles; and in this instance user A is a surgeon and user B is a cobbler. The user A and user B and other users input "Needle" in the query input window and perform a search using a reputed search site of the prior art and its search engine technology. The resulting query output consists of a number of results:

R1: Space Needle
R2: NordicNeedle.com
R3: Needle Necessities (a whole sale thread manufacturer)
R4: Needle Doctor (needles for phonographs)

And so on. Of the eight results presented by the search engine most relate to sewing applications. Inputting the word "needles" also delivers similar results. Consequently 1. These results have no contextual relationship to the user. All users inputting an identical query get the identical answer as query output irrespective of their background and or even geographical location.

2. Another limitation is that the ranking/order in which the results are presented is also identical for all users. However, each user has implicitly a different interpretation of the word "needle" which may not be explicitly expressed by the user. A physician who treats people and a veterinarian who treats animals are looking for different types of needles and there is no distinction made by the current search engine technology.

3. The results delivered are interspersed with relevant and irrelevant information forcing the user to manually determine the relevancy of the query output. Further, when the results are presented after a search in the prior art, there is a significant amount of the proverbial hay still left around the information. In this illustration the user A, a surgeon and user B, a cobbler did not get any relevant data on the needles they seek. In addition the four results that were presented are information about four needles that were not in any way relevant to user A and user B. There was no specific and single result that was highly relevant to the user.

The prior art thus suffers from a number of limitations. The user does not have the ability to maintain a plurality of public and private personality profiles nor does the user have the ability to hold and maintain different personality states. The Web Site and the individual web pages comprising the web site do not have the ability to have different personality profiles/states. The user does not have the ability to ascribe weights to various Input and Output query factors for personal relevancy. The user also does not have the ability to model one or more of the user personalities and maintain individual control. The web site behavior is the same for all users while the needs of the users are quite different. These prior art limitations significantly hinder the user from deriving increased utility of the Internet; which is fast becoming the medium of first choice. The present invention is designed to overcome the limitations of the prior art and significantly change the paradigm for navigating the web seeking information and conducting transactions.

Figure 2:
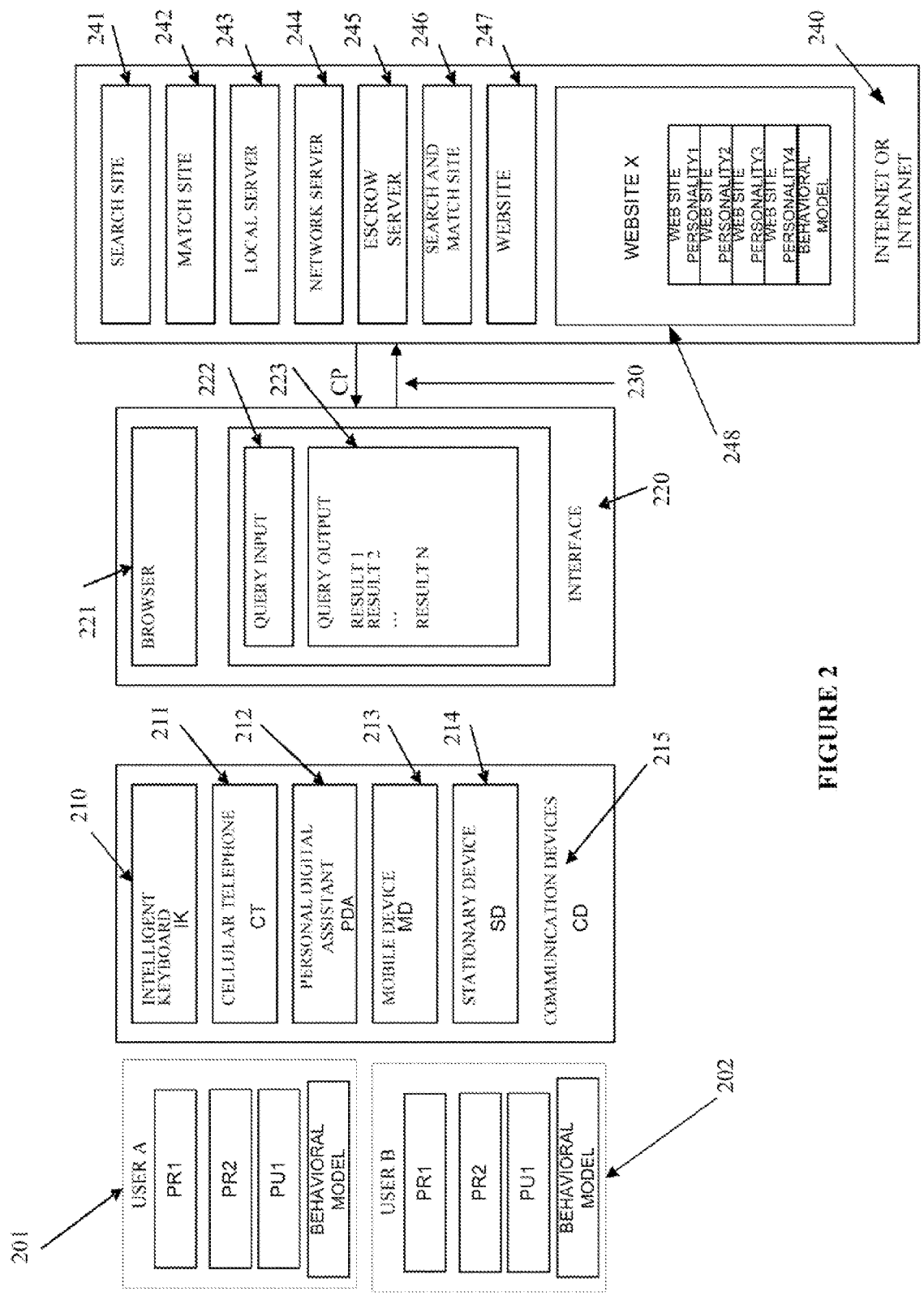
FIG. 2, shows the Matching Network System of the present invention showing a comprehensive network topology that comprises of Users, Communication Devices and one or more Servers on the Intranet or the Internet that are connected by wired or wireless means; wherein the users have multiple private and public personalities characterized by the User Behavior Model; the websites have multiple personalities characterized by the Website Behavior Model; and wherein the Match Site utilizes a Match Engine to match the request of the user for information, products and services provided by one or more websites; and further enables users and groups of users to be matched with each other.

FIG. 2: FIG. 2, shows an embodiment of the present invention which illustrates a comprehensive topology of the Intranet or the Internet embodying the present invention wherein the User, A 201 and User B 202 maintain a plurality of private and public personalities, the User A and User B are characterized by their Behavior Models; the users having the ability to communicate by means of different types of Communication Devices, CD 215, such as Intelligent Keyboards 210, Cellular Telephones 211, Personal Digital Assistants 212, Mobile Devices 213, Stationary Devices 214 and other devices; said communication devices having an Interface 220 that may consist of a Browser/Display 221 to facilitate easy navigation of the network or alternately the communication devices may employ means other than a standard browser, such as voice for input/output and navigation. The communication devices connect to each other and or the network via wired or wireless communication path CP 230. The User is enabled to connect to the Intranet or the Internet and communicate with, seek information from and execute transactions with one or more Web Sites 247, Search Sites 241, Match Sites 242, Local Servers 243, Network Servers 244, Escrow Servers 245, Search plus Match sites 246 and Websites X 248 that has website/webpage personality profiles/states. The following examples illustrate the various embodiments of the present invention. Other figures that are part of the present invention and disclosure serve to illustrate the various embodiments.

EXAMPLE 2.1

The present invention enables the user to maintain a plurality of private personality profiles PR1 through PRn and a plurality of public personality profiles PU1 through PUn. The personality profile is of great utility in maintaining different persona on the Internet, as the Internet or the World Wide Web has become the medium of choice for communication between users about who very little is known. There is therefore a need for selectively revealing the user's identity for specific transactions including the very basic action of information gathering. Additionally there is a need to mask the identity or alternately use a different personality profile for other interactions. User A 201 for illustration is a male physician and User B 202 is a female software engineer. The Behavior Model is used to characterize and model the individual user by means of the personality profiles and the actual history of the user in various prior interactions/transactions. The physician maintains a personality for interacting with professional colleagues, a different personality profile that is seeking a romantic partner, and yet another personality profile for navigating the Internet. The female software engineer maintains a personality profile for surfing the web seeking technical information of a professional nature, a different personality profile for finding a dating partner, and yet another personality for shopping purposes. The Matching Network system of the present invention enables generation of various personality profiles by each user and behavior modeling of the user with the control being maintained by the user. The user has the ability to use the communication device CD 215 to generate and maintain the personality profiles and or use one or more servers on the Intranet, Local Server 243 or the Internet Network Server 244. In the prior art this capability does not exist.

EXAMPLE 2.2

The present invention enables the Website X 248 and different web pages within the website to be characterized by one or more personality profiles and the ability to hold state for a specific user. The Website X is able to recognize that User A 201 and User B 202 have distinctly different personalities and deliver web pages and website functionality that is matched to the needs of each user. As an example User A when visiting the website X is presented with the website personality 1 and User b is presented with a different website personality 2. The website additionally holds a different state for User A and User B delivering different functionality for each user. Prior art does not enable this feature which is of great utility and instead only provides a web experience that is identical for each and every user. In addition the present invention defines the Matching Network system that enables the user to leverage the full capabilities of the Intranet Local server 243 and one or more servers located on the Internet.

EXAMPLE 2.3

The present invention defines the ability to utilize match based techniques that are of far greater utility than the prior art of search based techniques. The ability to characterize the Users, Websites, Products and Services by the personality profiles and behavior models enables matching of the User with the desired information, product or service in a more efficient manner. To illustrate, user B, the female software engineer prefer a specific brand and shade of lipstick. The personality profile and the behavior model of the user are maintained on the communication device CD 215 and or the Local server 243 with the ability to recognize the preferences of the User B 202 and update prior history data and forecast most likely future behavior of the user. The user B logs on to the Internet and types the word in the browser or speaks the word "lipstick". The results displayed are now specific to the particular brand and shade of lipstick desired by user B. In the prior art the results would be extensive and not readily of relevance. The User B desiring to purchase the lipstick is matched with the Website/web pages of the vendor that offers the particular brand and shade of lipstick.

Matching requires the characterization of the User and the Provider and is best achieved when the data set at both ends is well characterized and modeled. The prior art of searching does not rely on characterization of the User or the Provider and consequently the user must apply personal analysis without the aid of computers and thus derives limited utility. As the Web use becomes more pervasive, the utility is enhanced by match based processes of the present invention.

EXAMPLE 2.4

The present invention in addition to being applicable for matching is also applicable to search based processes. Searching is significantly improved when coupled with the personality profiles of the user and the behavior model of the user. The personality profiles and behavior models are applicable for search based techniques even if the other users and websites are not characterized. The personality profiles and behavior models of user B 202 may be maintained at the communication device level or at the local server level 243 under the lull control of the user. This scheme enables the user to launch a search that is very specific and analyze the search results utilizing the processing power of the communication device CD 215 and or the processing power of the local server 243 and network server 244. In this scenario the search results finally delivered to the user are more relevant and more specific. The prior art of user agnostic search based techniques that are centralized at the Search Site do not provide the means for determining personal relevancy in a private and secure manner.

The present invention enables the use of a combination of search and match based techniques for delivering great utility to the user using the capabilities of the communication device by itself and or the Intranet/Internet servers. The search based and match based techniques are used in combination and or iteratively and in the sequence desired by the user to deliver the utility desired by the user. The search process is under the control of the user and deployed by the user at one or more locations on the Intranet or the Internet using search methods and search algorithms that are personalized. In the prior art the search services are provided in one centralized location at the Search Site provider, said provider utilizing search techniques that are not user specific.

Figure 3:
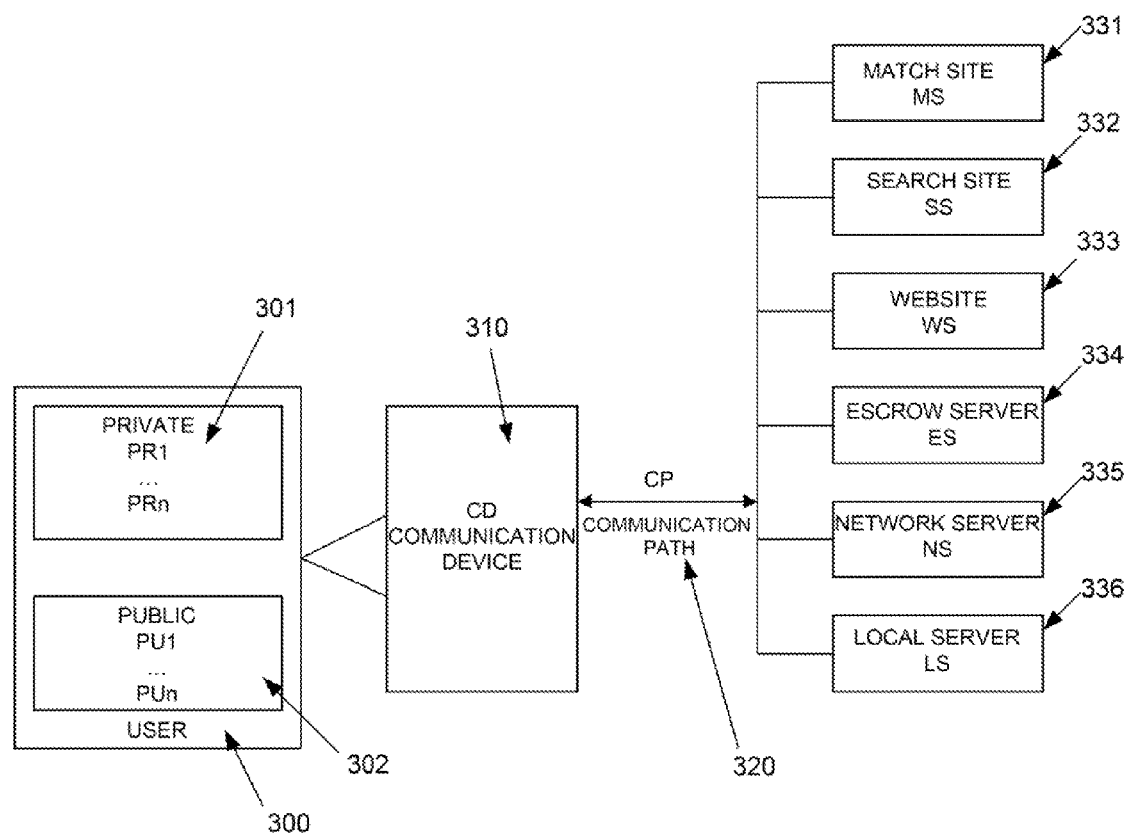
FIG. 3 shows the user with multiple private and public personality profiles using wired or wireless communication devices to connect to the websites and servers on the Intranet and or the Internet for search, match and escrow services.

FIG. 3 shows an embodiment of a Matching Network system of the present invention showing a User 300 maintaining a plurality of private personalities, 301 represented by PR1 through PRn and a plurality of public personalities, 302 represented by PU1 through PUn. The user is enabled to maintain private and public personalities in various data bases/ look up tables. These databases/lookup tables reside at different nodes in the network, on devices and on servers that are part of the Matching Network system. The matching network system consists of communication devices CD, such as the Intelligent keyboard, IK, the cellular telephone CT, personal digital assistant PDA, mobile device MD and stationary device SD; local server LS 336, network server NS 335, escrow server ES 334, web site WS 333, search site SS 332 and match site MS 331. The different nodes, devices, web sites, search sites and servers are connected by wired or wireless path CP 320 for communication of information that consists of audio, video, images, graphics and data. The user maintains one or more personalities or parts of a personality on different communication devices, web sites, search sites, match sites and servers based on the security and permission levels set by the user and the speed/ease of use desired by the user.

FIG. 3 also illustrates the implementation of a plurality of private and public personality profiles for navigation, seeking information, searching, matching, negotiating and executing transactions with varying levels of security while limiting private or public exposure. User 300 maintains a plurality of personalities for different types of interactions over the World Wide Web, the Internet, the Intranet or the local network. These personalities are described in software and maintained in one or more databases/lookup tables and or capable of being hard coded into the communication device itself. The following examples illustrate various unique implementation schemes.

EXAMPLE 3.1

For illustrative purposes the user 300 maintains the following private and public personalities:

| Private Personalities | | Public Personalities | |
|---|---|---|---|
| PR1 | Husband | PU1 | Citizen |
| PR2 | Shopper | PU2 | Shopper |
| PR3 | Executive | PU3 | Rotarian |
| PR4 | Auction Bidder | PU4 | Web Fan |

1. The user 300 wishes to maintain a high degree of personal control in how and where the multiple private and public personality profiles are maintained. For illustration, the private personality profiles PR1 is maintained on the communication device 310. The private personality profiles PR2 and PR3 are maintained on a local server 336 and the profile PR4 is maintained at the escrow server 334.

2. The user 300 maintains the public personality profiles PU1, PU3 and PU4 on the communication device level 310, the local server level 336, and the network server level 335. The public profile PU2 is maintained at the favorite shopping web site level.

3. The personality profile is generally described in software using Extensible Markup Language, XML language or other languages for easy and efficient interaction with one or more databases and lookup tables.

4. The user 300 selects the private personality profile PR1 to communicate with the family or spouse. The communication is of a personal nature and the user does not wish to have this private profile resident on the local network or the Internet. The communication device 310 is further enabled with software and hardware security features.

5. The user 300 selects the private personality profile PR2 to conduct shopping transactions of a personal nature without disclosing complete information to the vendor or the web site except to enable payment. This limits the ability of the vendor to gather specific information about the user and limits the possibility of the misuse of private information and identity theft. Utilizing the communication device 310, the user connects with the local server 336 to maintain a private personality profile, modify the profile, temporarily download a personality profile and or select and use a specific personality profile for navigation of the web and or in transactions.

6. The user 300 utilizing the communication device 310 selects the personality profile PR3 resident on a local server 336 to communicate with other executives and business associates.

7. The user 300 wishes to participate in an auction and bid on a product, property or service without disclosing the true identity of the user to the auctioneer or other bidders. In this implementation the escrow server 334, acting as a trusted server acceptable to all parties, maintains the private personality profile PR4 and enables the partial or full range of the transaction with web site 333 without disclosing the true identity of the user before, during and or after the auction. In another implementation the user 300 navigates the Internet looking for information, products and services and generally conducts on line research without disclosing the true identity using search site 332 and escrow server 334, communication device 310 and wired or wireless communication means 320.

8. The user 300 having one or more public personalities, communicates via the regular public Internet access and or a combination of the methods illustrated in item 1 through 7 of this example 3.1 wherein the local server, network server and or the escrow server is utilized.

Figure 4:
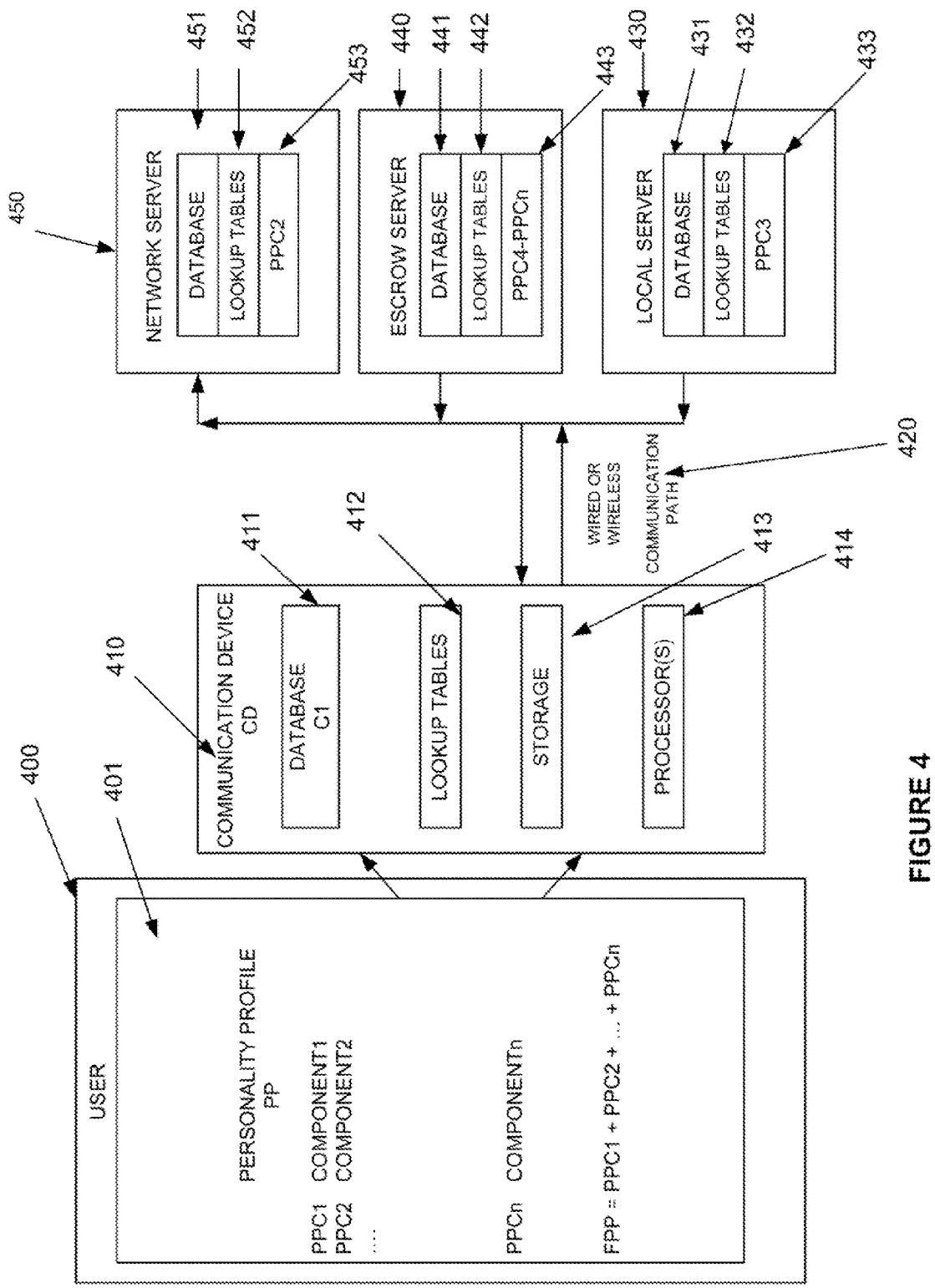
FIG. 4 shows the added security feature wherein the personality profile consists of multiple components that are maintained in one more locations on the matching network including the communication device level or the server level for compilation of the personality profile upon user request.

FIG. 4 shows an embodiment of a Matching Network system of the present invention illustrating the means for establishing the private and or public personality profile comprising of one or more personality profile components, PPC1 through PPCn, that when aggregated/compiled together form the full and complete personality profile. The different components forming the personality profile are maintained at one or more locations on the matching network in different databases 431, 441 and 451 and lookup tables 432, 442 and 452, resident on the communication device and or the servers. The aggregation or compilation of the desired personality profile is dynamically executed at the discretion of the User 400, at the Communication Device 410 and or the Network server 434, Escrow Server 435, and Local Server 436 to facilitate specific transactions.

The user has the ability to define how the aggregation/compilation of the full personality profile takes place, the purpose of the aggregated personality profile, the time duration of its existence and other features. Each personality profile component is encrypted as is the aggregated full personality profile for additional security and avoidance of profiling/snooping by third parties, identity theft and or fraudulent use. Additionally, the user 400 is enabled to select one or more complex algorithms for the aggregation or compilation of the full personality profile from the various components that the profile comprises of. The communication across the matching network is by wired or wireless means, 420. In this instance the aggregation of the personality profile components is shown at the user end on the communication device.

Figure 5:
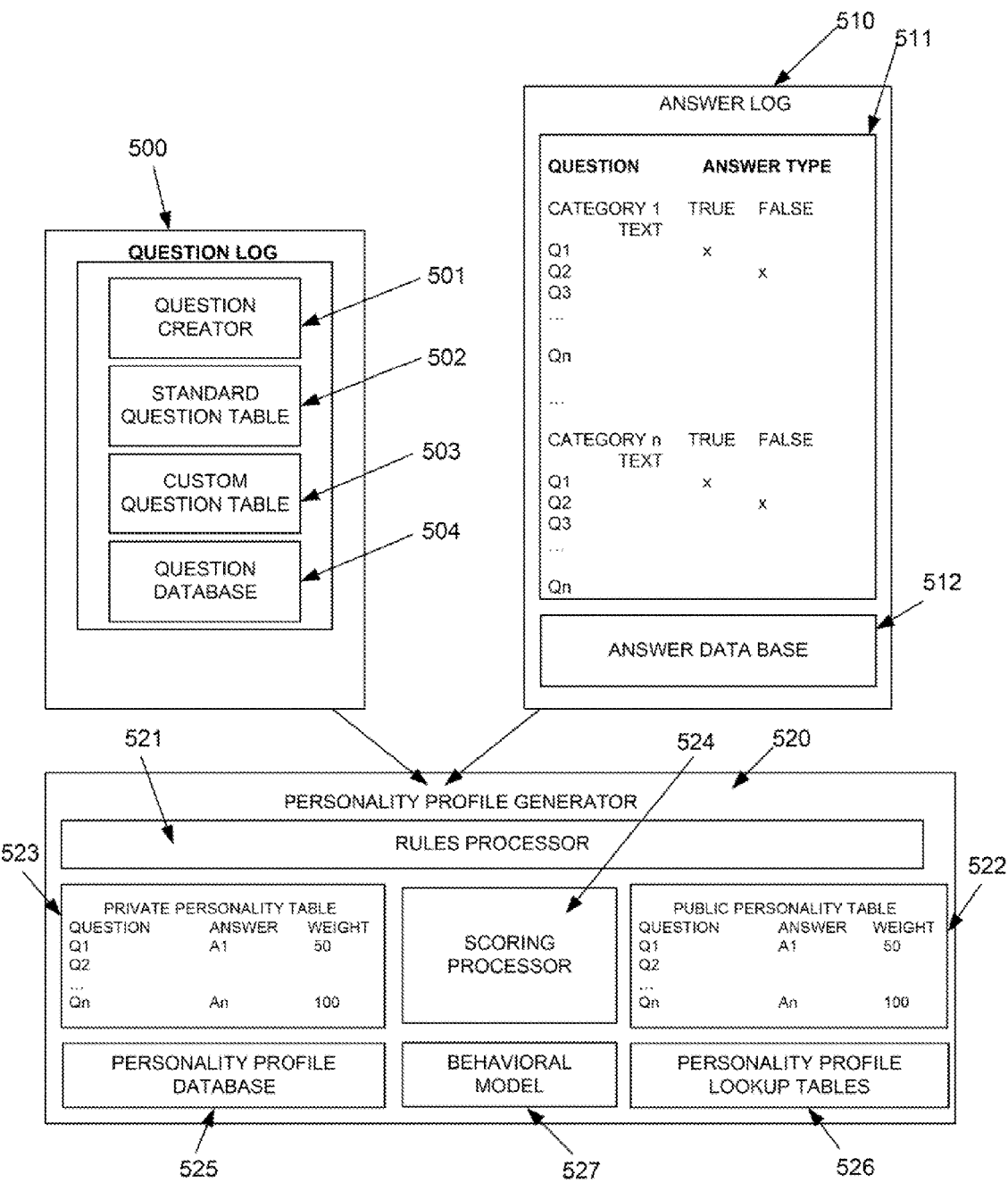
FIG. 5 shows the means for creating private and public personality profiles by the user. The user is enabled to create a Question Log and a corresponding Answer Log for self characterization by means of the Personality Profile Generator, ascribing weights to various questions and answers. Additionally the question and answer logs and data bases are of utility to characterize the personality profiles of other users. The user is also enabled to develop the User Behavioral Model based on prior history and predictive algorithms.

FIG. 5: A novel embodiment of the Matching Network system is that the system consists of different users having a plurality of private and public personality profiles that are defined by the users themselves rather than a third party such as a vendor or, a Website. FIG. 5 illustrates the process for interactively self developing, maintaining and utilizing the public and private personality profiles by the user utilizing any type of wired or wireless communication device and or a local or network server.

The Question Log 500 consists of the Question Creator 501, the Standard Question Table 502, the Custom Question Table 503 and the Question Data Base 504. The Answer Log 510 consists of the Question and Answer Table 511 and the Answer Data Base 512. The Personality Profile Generator 520 consists of Rules Processor 521, Public Personality Table 522, Private Personality Table 523, Scoring Processor 524, Personality Profile Data Base 525, Personality profile Lookup Tables 526 and Behavior Model 527.

The user selects one or more questions from the Standard Question Table 502 and provides answers to these questions which are written to the Answer Log. The user is also enabled to create custom questions via Custom Question Table 503 that are user specific and similarly store the answers in the Answer Log 510. The questions and answers are organized in different categories for easy selection to assist in the personality profile definition and subsequent behavioral model development. The user now has a Question Data Base, 504 and a corresponding Answer Data Base, 512, that is then used in generating the user's specific public or private personality profiles via the Personality Profile Generator 520.

The Personality Profile Generator 520 comprises of a table for a specific private personality profile 523 and for a specific public personality profile 522, wherein the questions, answers and the weights ascribed by the user to these question-answer pairs is maintained. The Scoring Processor 524 enables the means for calculating the composite weighting of various questions and answers. The resulting private and public personality profiles are maintained in database 525 and 526 respectively. The user is able to set up different rules for different personality profiles and apply these rules via the Rules Processor 521. Additionally the Behavior Model enables the user's prior history and decision processes to be modeled for future predictive behavior and serves as a tool that assists the user.

In the prior art the users do not have the ability to generate their own multiple private and public personality profiles and also behaviorally model their own personality. In the prior art the user does not have the means for deploying the personality profiles at the communication device level or the server level and or the means for personally managing the personality profiles across a network. The present invention of the Matching Network system enables secure self-development and self deployment of multiple personality profiles conforming to the rules defined by the user.

To generate a private personality profile the user selects questions of relevance, such as Q1, Q2, Q3 and Q4 from one or more categories and ascribes weights to the question and answer pair, which is stored in the Private Personality Table 523. The questions selected may be from the Standard Question Table 502 are from the Custom Question Table 503. The Question Creator, 501 enables the custom questions to be created by the user. The Scoring Processor, 524 computes the score based on the weighting for each question-answer pair and the total questions used. The resulting personality is checked for conformance to the user defined rules via the Rules Processor 520. The user approved personality profiles are stored in the personality profile data base, 525 and is also input in abbreviated form into the look up table, 526 for speedy reference and efficient execution. Similarly the user is enabled to generate public personality profiles. Users are enabled to have multiple private and public personalities which are of great utility in matching people or matching providers with individuals on the web. The personality profiles are applicable to the process of searching also.

EXAMPLE 5.1

This example illustrates in detail the novel process of developing and maintaining private and public personality profiles by creating questions that are relevant in defining the user. The User is a college student in real life and wishes to maintain a persona for social interactions such as finding a life partner and another for professional interactions such as finding a job. In this example the questions are selected by the user from the standard data base or created by the user utilizing the Question Creator 501:

Q1. Which do you prefer?
Beer
Scotch
Neither
Answer: Beer
Q2. How often do you party?
Everyday
Fridays
All week end
Answer: Everyday
Q3. What is the color of your hair?
Black
Brown
White
Blond
Answer: Black
The above questions were of a multiple choice nature.
Q4. What is the college you currently attend?
Here the user is enabled to enter a descriptive textual answer.
Massachusetts Institute of Technology
Q5. Do you love sea turtles as pets?
This question is not part of the standard question data base. The user, utilizing the question creator, is able to input questions of relevance to the user.
Q6. What is the highest degree you have?
High School
Bachelors
Masters
Answer: Masters The user may create any number of questions in one or more categories. The Question Creator and the Answer Log are designed to accept different formats of questions and answers, such as True/False, Multiple Choice and Text and data based responses. The novel feature of creating questions or using standard questions; associating answers to the specific questions, assigning weights to the question-answer pairs and generally self defining the user personality profiles is of great utility.

Figure 6:
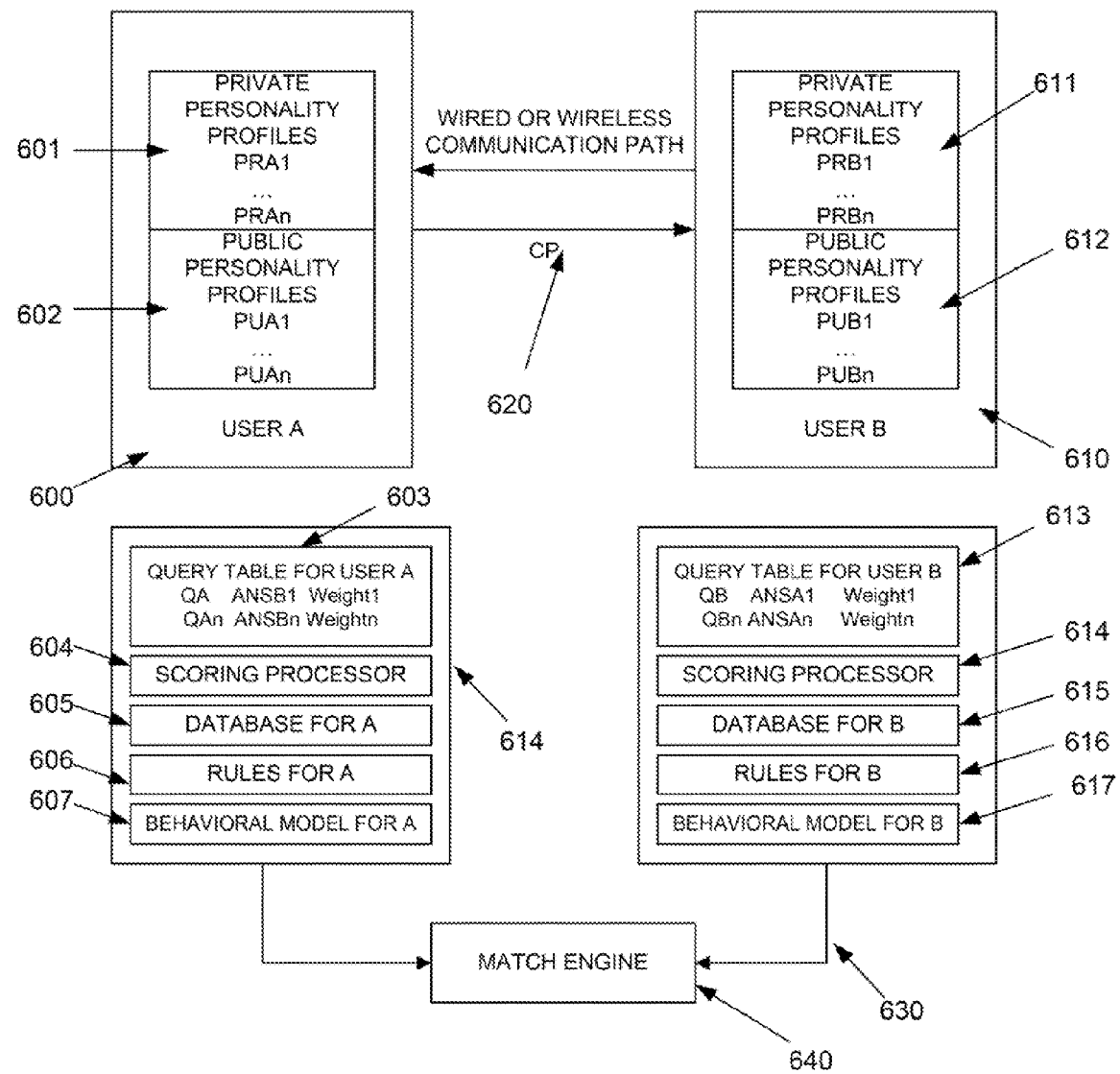
FIG. 6 shows the means for the determination of the personality profile of one user A by the other user B; and the personality of user B by the other user A. Additionally, the behavior model and predictive actions of other users may be determined. The same concept is extendable to multiple users to enable the matching of one or more users. The illustration shows a common Match Engine for user A and user B and means for direct communication between User A and User B.

FIG. 6: FIG. 6 shows an embodiment of the Matching Network system of the present invention that enables the mutual and direct discovery of the personality profile of one user by another user. User A, 600, maintains private personality profiles 601 and public personality profiles 602. User B, 610, maintains private personality profiles 611 and public personality profiles 612. The Query Table 603 for user A contains the questions posed by user A to user B and the corresponding answers provided by user B to each of these questions with the weighting assigned by user A to each question and answer pair. The Query Table 603 for user B contains the questions posed by user B to user A and the corresponding answers provided by user A to each of these questions with the weighting assigned by user B to each question and answer pair. User A has a Scoring Processor 604, Database 605, Rules 606 and Behavior model 607. User B has a Scoring Processor 614, Database 615, Rules 616 and Behavior Model 617. The enumerated elements are shown to exist at the communication device level but may also exist at the server level. A common Match Engine 640 located at a Match Site is shown in the illustration to which user A and user B connect via wired or wireless communication path 630. User A and User B use either standard questions or custom questions that are created by the users to determine the personalities of each other. The questions may be dynamically selected in real time for query. User A and User B having discovered the personality profiles of each other have the freedom to communicate or decline to communicate.

The unique method for creating questions and keeping track of the weighted answers provides the basis for the dynamic determination of the personality profiles of the users. This feature forms the basis for the creation of Personal Matching Networks and Group Matching Networks illustrated in detail elsewhere in FIGS. 8, 9 10, 11, 12, 13 and 14 of the present invention.

EXAMPLE 6.1

The Question Creator-Answer Table 603 and 613, Matching Engine 640 have the potential to enable electronic learning and mobile learning. The test creator has the ability to facilitate real time assessments of skills. The Query Table 603 for user A and 613 for User B, and the Scoring processors 604 and 614 enable interactive or group mobile learning.

Figure 9:
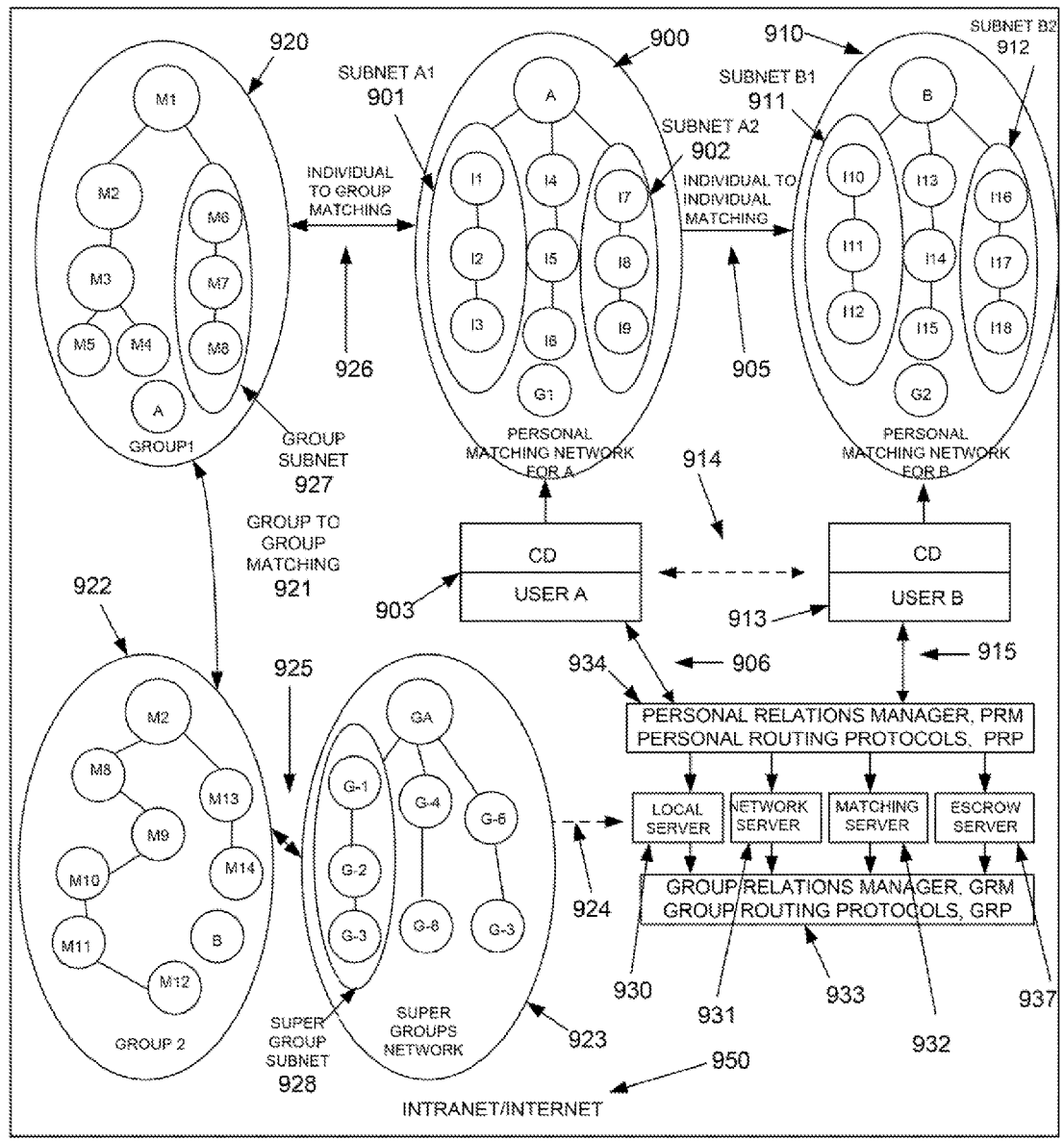
FIG. 9 shows the Personal Matching Network and the Group matching Network embodiments. The means for interaction, matching and management of Personal Matching Networks and Group Matching Networks is illustrated.

The teachings described herein coupled with the features described in FIG. 9 are used in the Personal Matching Network and Group Matching Network context to share information, dialogue, and provide utility in intra network and inter network applications.

This novel feature of the present invention provides the tools and establishes the means for mutual discovery/authentication and approval by mobile device and stationary device users and enables real time communication keeping the identity masked, partially revealed or fully revealed at the sole discretion of the users.

Figure 7:
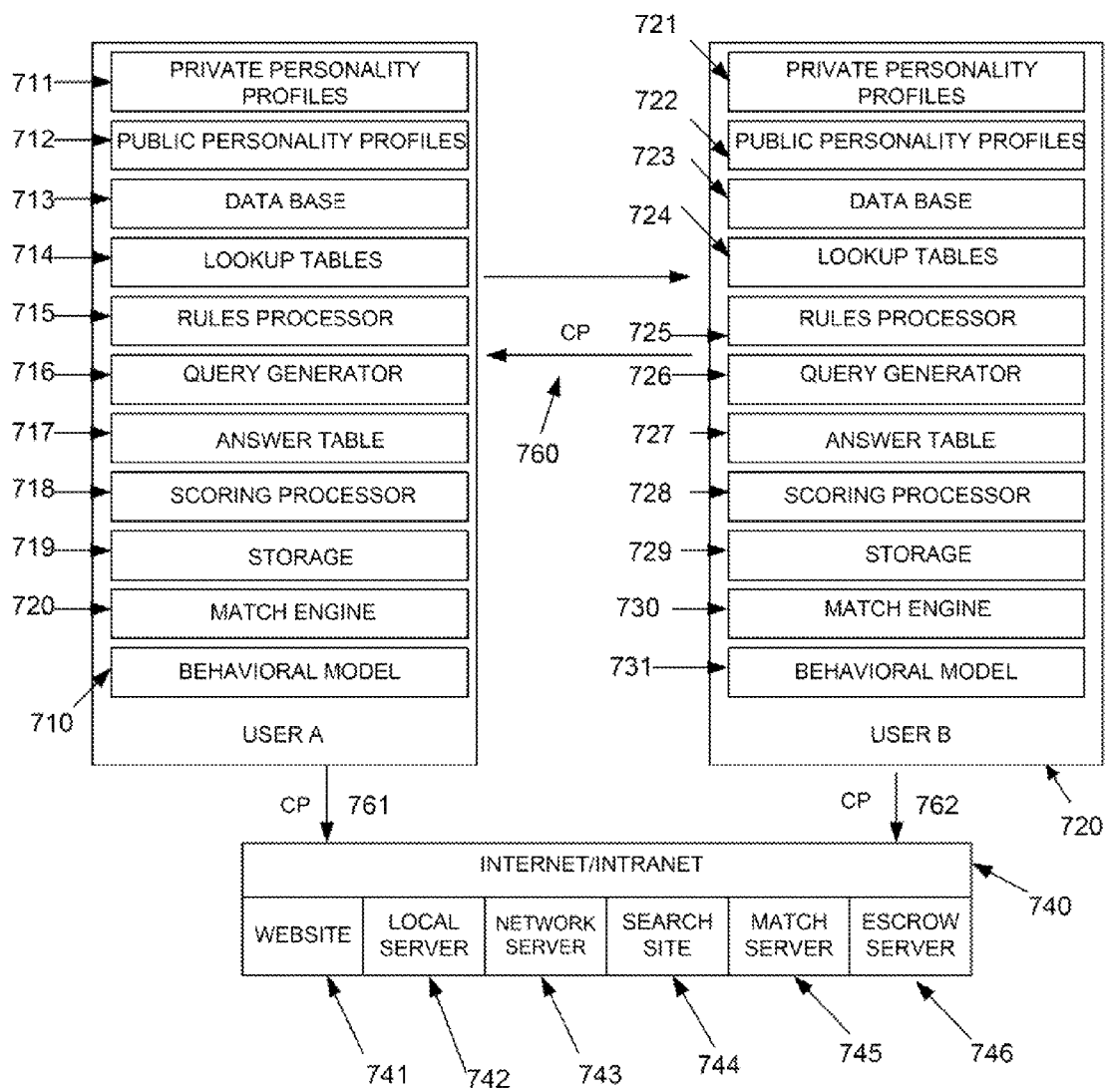
FIG. 7 shows the means for the determination of the personality profile of a user by one or more other users by direct communication between the users. The Match Engine capability is built in to each communication device for direct matching. Additionally the match process and other functions are augmented by the Match Server and other servers that are on the Intranet or the Internet. The behavior model of other users may in turn be modeled by a user to determine and predict actions of other users.

FIG. 7: FIG. 7 shows an embodiment of the Matching Network system of the present invention illustrating the means for querying of one user by another user utilizing one or more personality profiles. This figure illustrates the universal applicability of the Matching Network system to Person to Person matching, Mobile Device to Mobile Device matching, Computer to Computer matching, User and Product/Service matching and Buyer and Vendor matching and combinations thereof.

A personal Match Engine is deployed by each user to determine the potential feasibility of a relationship. The users are enabled to discover each other, communicate with each other and negotiate with each other with the ability to maintain total and complete anonymity and or reveal the desired personality details at different stages of the communication/negotiation process. This novel embodiment of the present invention is of great utility to research relationships, negotiate relationships and establish relationships with one or more known/unknown individuals, utilizing the Internet with universal applicability to social, professional and commercial relationships. The present invention also limits the potential for identity theft.

Referring now to FIG. 7 in detail the specific embodiments of the present invention are explained and illustrated. The User A denoted by 700 maintains at the communication device level Private personality profiles 711, Public personality profiles 712, communication device level Data Base 713, Lookup Tables 714, Rules Processor 715, Query Generator 716, Answer Table 717, Scoring Processor 718, Storage 719, Behavior Model 710 and Match Engine 701. The User A is also enabled to maintain in tandem these entities and functions at the Local Server 742, the Network Server 743 and or the Escrow Server 746 level if desired.

In a similar manner User B denoted by 720 maintains at the communication device level Private personality profiles 721, Public personality profiles 722, a device level Data Base 723, Lookup Tables 724, Rules Processor 725, Query Generator 726, Answer Table 727, Scoring Processor 728, Storage 729, Match Engine 730 and Behavior Model 731. The user B is also enabled to maintain these functions at the Local Server, the Network Server and or the Escrow server level if desired. The wired or wireless communication path between User A and User B is indicated as 760, the wired or wireless communication path between the User A and the Servers is indicated by 761 and the wired or wireless communication path between the User B and the Servers is indicated by 762. The Website, 741, the Network Server 743, the Search Site 744, the Match Server 745 and the Escrow Server 746 are shown on the Internet. The Local Server 742 is in the inside line path on the Intranet. The Intranet/Internet is indicated by 740.

The system scheme is more readily apparent by the use of illustrative examples:

EXAMPLE 7.1

The illustration refers to the means for wired or wireless communication and interaction between multiple individual users and groups of users by the use of the Communication Device, Escrow Server, Matching Server, Network Server and or a Local Server while maintaining personal control over when, if and how the true identity is revealed after negotiation. In forming different types of groups it is desirable to qualify the individuals for entrance into the specific group. As a specific illustrative example, college students who are currently enrolled or who are alumni of the educational institution have e-mail addresses that have a common post fix of ".edu".

1. A Match Site with a dot corn web address and a Matching Server 745 is designed for fostering social interaction between college students as one of its many service offerings.

2. College students visit the Match Site on the Internet and register with their real e-mail address ending with a post fix of ".edu". An example of the email address "johndoe@mit.edu"

3. The email address is very specific in that it defines the individual as a current registered student at a particular educational institution and generally enables the user to be authenticated as belonging to the college group.

4. Multiple users from same or different educational institutions register with the Match Site answering basic registration questions. The Match Site assigns a user ID and a corresponding email address. "USERID@thematchsite.com"

5. The Matching Server 745 maintains a database and corresponding lookup table for each registered user. The lookup table maps the real ID and the real email address of the user into a table with the corresponding user ID and the new masked email address that is assigned by the Match Server. This process enables the masking of the real email ID of the user for legitimate purposes. Example:

Real Table Entry 1:
John Doe, Cambridge, Mass.; Freshman, class of 2007; johndoe@mit.edu
  Corresponding Table Entry:
  UserID1@thematchsite.com, password: xxxxxx Real Table Entry 2:
Jane Smith, Cambridge, Mass.; Freshman, class of 2007; janesmith@harvard.edu
Corresponding Table Entry:
UserID2@thematchsite.com, password: yyyyy 6. Each individual who registers may complete standard personality questionnaire that consists of suggested questions and additional questions that may be selected by the user from a Question Data Base resident on the Match Server. The user is also enabled to use questions generated independently by the user, which are input into the user's database. This enables the registrant to develop, customize and establish one or more private and public personality profiles for the self using personally specific questions. Additionally the user is enabled to define the set of rules for defining a potential match, said rules being maintained in a database on the Match Server.

7. Users are enabled to request a match from the Match Site for one or more purposes, such as for dating, for homework collaboration, for sports, for travel and other purposes. The Matching Server consists of a Match Engine. The Match Engine using the personality profiles of all the users and or a subset and the rules defined by the user determines a match after scanning the relevant databases and applying efficient matching algorithms.

8. Users A, John Doe from MIT, having User ID1, desires to be matched with a Harvard freshman of the opposite gender for help with homework in the freshman English class. User A submits a request by visiting the Match Site or by other means such as e-mail.

9. The Match Engine determines that User B, Jane Smith from Harvard having user ID2 is the perfect match and has further indicated a willingness to tutor in her personality profile.

10. The Match Engine provides either one way notification by e-mail or other means such as visiting a private web page for notifying User B, Jane Smith, first wherein User B has the chance to review the masked profile of User A. User B then has the ability to communicate directly using the pseudo email address ID2@thematchsite.com by sending email to ID1@the matchsite.com. At this point the direct interaction and negotiation is enabled between the two parties A and B, who may choose to reveal their identity at an appropriate stage of interaction. Alternately the Match Engine notifies both parties, without revealing the true identity and either party is free to contact the other first or ignore the requested match.

11. Additionally, the User A and User B are enabled to directly query each other by using the Query Generator 716 for A and 726 for B to determine information of relevancy to each other in conjunction with the Match Site and the Match Server and or the Escrow Server.

The foregoing example illustrates the novel feature of match driven people to people interaction based on multiple private and public personality profiles, having the ability to negotiate the terms of the interaction and the freedom to reveal the identity at the desired time. The current search engine based processes lack in efficiency and privacy because the user has to laboriously seek and sift through information that most often is not relevant. Additionally the user is forced to reveal the identity at a very early stage without having a chance to determine the suitability of the other party and or having a chance to negotiate a relationship.

EXAMPLE 7.2

User A is a male college student maintaining a specific private personality profile that is designed for dating purposes. This private personality profile was generated by User A through the process of answering a series of questions and providing answers to the questions, said data being stored in the appropriate database and look up tables on the communication device itself or on a local, network or escrow server. User A has in addition defined his rules for defining what elements constitute a match for social interaction in the dating scenario. In a similar manner User B, who happens to be a female college student has established a specific private personality profile and the specific rules that she wishes to apply to determine what constitutes a match.

User A using communication device 700 and User B using similar or different type of communication device 720 communicate with the Match Site server 745. User A and User B maintain their private personality profiles at the Match Site, 745 that facilitate matching of individuals based on specific match based modeling and the user defined rules. The Match Site determines that based on the private personality profiles provided by both parties there is a match between User A and User B conforming to the rules defined by both parties such as dating. However, the identity of User A is not known to User B and vice versa. User A and User B are notified of that a match is indicated based on the rules defined by both parties. The notification is done using the pseudonym email ID of each user, without disclosing the identity of either party to the other. At this point the user A and user B are free to contact each other directly using the pseudonym ID and or fully reveal their true identities. However, each party would like to know more about the other for safety, security and the need to avoid embarrassment and continue using the pseudonym ID.

The communication between the parties A and B is conducted through the Match Site using web based methods, pseudonyms, or e-mail ID that is specially created for this specific purpose. Each party selects specific questions from the available Question data base and or generates their own questions to better determine the personality of the other party using Query Generator 716 for A and 726 for B. The questions posed by A are answered by B either directly and or through the use of the Match Site and written into the Answer Table 717. And similarly the questions posed by B are answered by A and written into Answer Table 727. The queries and the answers are stored in the appropriate data bases 713 and 723 and Lookup Tables 714 and 724.

The User A and the User B may assign individual weights to the different questions and answers in addition to defining specific or general rules for matching in the Rules Processor for A, 715 and Rules Processor for B, 725. The scoring of the questions and answers with the appropriate weighting is performed by the Scoring Processor for A 718 and Scoring Processor for B 728. The Match Engine for A 701 determines if there is a match acceptable to A and the Match Engine for B 730 determines if there is a match acceptable to B. Alternately the determination of the match is performed at the Match Site 745 and or an Escrow Server 746. At any stage the true identity of A or B is not revealed without both parties consenting.

Additionally, as the interaction continues between the parties A and B, there is a need to exchange critical and vital information. This is important even if the identity is known or is still not revealed. The Escrow Server 746 notifies and enables both parties to determine that the other party has provided the information requested by the other in a timely manner before proceeding to the next level of interaction. The information may be provided to the Escrow Server by both parties.

A specific illustration of this feature is that if A and B wish to exchange photos while not knowing the true identity and the real contact information of each other, then the Escrow server enables that and notifies both parties of compliance or non compliance. The female college student B has ascertained, without disclosing her true identity, that the personality of the male college student A is acceptable to her through this interactive query process. However, after seeing the photo of A she declines to proceed further. This is possible with the present invention that lets people discover each other in a less intrusive and protected manner. While the example illustrated is for social interactions between two parties it is equally applicable for other social, commerce and professional interactions between multiple individuals and groups; and is not to be construed as limited to the example cited herein.

EXAMPLE 7.3

In this example the Matching Network system location dependent and dynamic real time matching. Two college students, User A and User B, are traveling alone in Europe for the summer with communication devices that have GPS location determining features. It is late in the evening. The students would like to find a room for that day and share the room. Each user maintains a personality profile for this type of purpose. A query for room sharing is generated by User A and sent to the Match Site located on the Internet. The Match site determines that the User B is in the vicinity and has a profile that is compatible and indicates a potential match. User B is queried by the Match Site and provided information about A and indicates an interest. User A and User B are enabled to directly communicate.

EXAMPLE 7.4

The prior art does not enable the full range of instantaneous, dynamic, delayed or time frequency based matching or searching. The data on the Internet or the Intranet is dynamic and the databases are being dynamically updated with new information. This static query at a given point in time does not guarantee a match to the query or in the cases of search present the results that are dynamically relevant. Additionally, the current search engines index web pages at some point in time and do not dynamically and instantaneously update the indexed web pages. Consequently the information provided by the search engines is not timely and time correct.

The present invention enables the request for a match or a search to be executed automatically in the manner and with the frequency desired by the user using the same or different personality profiles of the user. College student A is looking for a room mate at the beginning of the month and the Match site indicates no match at that time. However the college student has requested that the database of the site or other sites be automatically polled every day for this match. The present invention enables that polling and notification feature. Similarly, the search for information is not static. The polling and notification feature is equally applicable to search based techniques as disclosed in the present invention.

EXAMPLE 7.5

In the prior art there are significant limitations with the e-mail services which are plagued by significant and growing Spam problems. The e-mail is generally received by the E-mail Server located at the service provider where the User maintains personal email accounts. The filters provided by the service provider are generally driven at the highest block level by the designated contact list of the User, with other levels being less filter proof. The filter programs also block valid e-mails with delayed notification or no notification of important emails. There is a legitimate need for organizations to send bulk email. However, in the prior art the filters classify these bulk emails as spam. Another limitation is that once an email address is given to a Vendor or others, it quickly becomes a publicly traded commodity spawning more spam. The embodiments of the present invention overcome these limitations and problems.

The present invention enables the utilization of the Escrow Server for email filtering wherein the user's apply their own filtering algorithms, using one or more personality profiles, to all incoming email rather than being limited to the generic filtering algorithms that the service provider enables. The email is received first by the Escrow Server and or may be forwarded to the Escrow Server from the current provider, wherein the Escrow Server applies various user defined personality profiles to authenticate and match the email sender/content with the user, thus eliminating significant spam. The user is additionally enabled to compare a user personality profile with the contents and images of the email, filtering content or the entire email based on text scan/word/phrase relevancy and objectionable image types.

The present invention enables the User A as an example, to establish one or more pseudonym email addresses at the Escrow Server for each of the user's personality profiles thus ensuring that the true or real email address is not revealed to the public for elimination of spam. The pseudonym email addresses are mapped to the real email address of the User and the email notification to the real email address of the User A is performed after relevant personality based screening and sorting by the Match Site using the Escrow Server as an email server.

Real email ID: UserA@serviceprovider.com
User A Personality profile 1 for business use: MaskUserAID1@Matchsite.com
Real email ID: UserA@serviceprovider.com
User A Personality profile 1 for business use: MaskUserAID1@Matchsite.com
User A personality Profile 2 for close family use: MaskUserAID2@Matchsite.com
User A personality Profile for online shopping use: UserAID3@Matchsite.com The filtering programs and algorithms applied to each personality profile are determined by the User A. The User A is also enabled to send and receive text email, said text/words being scanned for appropriateness to a personality profile using the appropriate personality profile for the User A and the corresponding masked email address.

The present invention enables the embodiment of the invention to be applied to Voice and Audio Mail screening. The voice patterns of known individuals are characterized using voice recognition patterns, having these voice patterns maintained in a database on a local or network server, associating said voice/audio patterns by Users ID and personality profiles and causing the voice/audio mails to be characterized and segregated into one or more categories for relevancy. As an example the voice mails are enabled to be screened for objectionable language and sales calls.

The present invention enables the embodiment of the invention to be applied to Image Mail screening. The Images, including still, video and graphics are characterized using image recognition patterns, having these image patterns maintained in a database on a local or network server, associating said image patterns by Users ID and personality profiles and causing the image mails to be characterized and segregated into one or more categories for relevancy. The present invention enables the screening of the combination of text, data, voice/audio and image mails in the email format or other communication formats using the communication itself and or in conjunction with the local server or the network servers.

Figure 8:
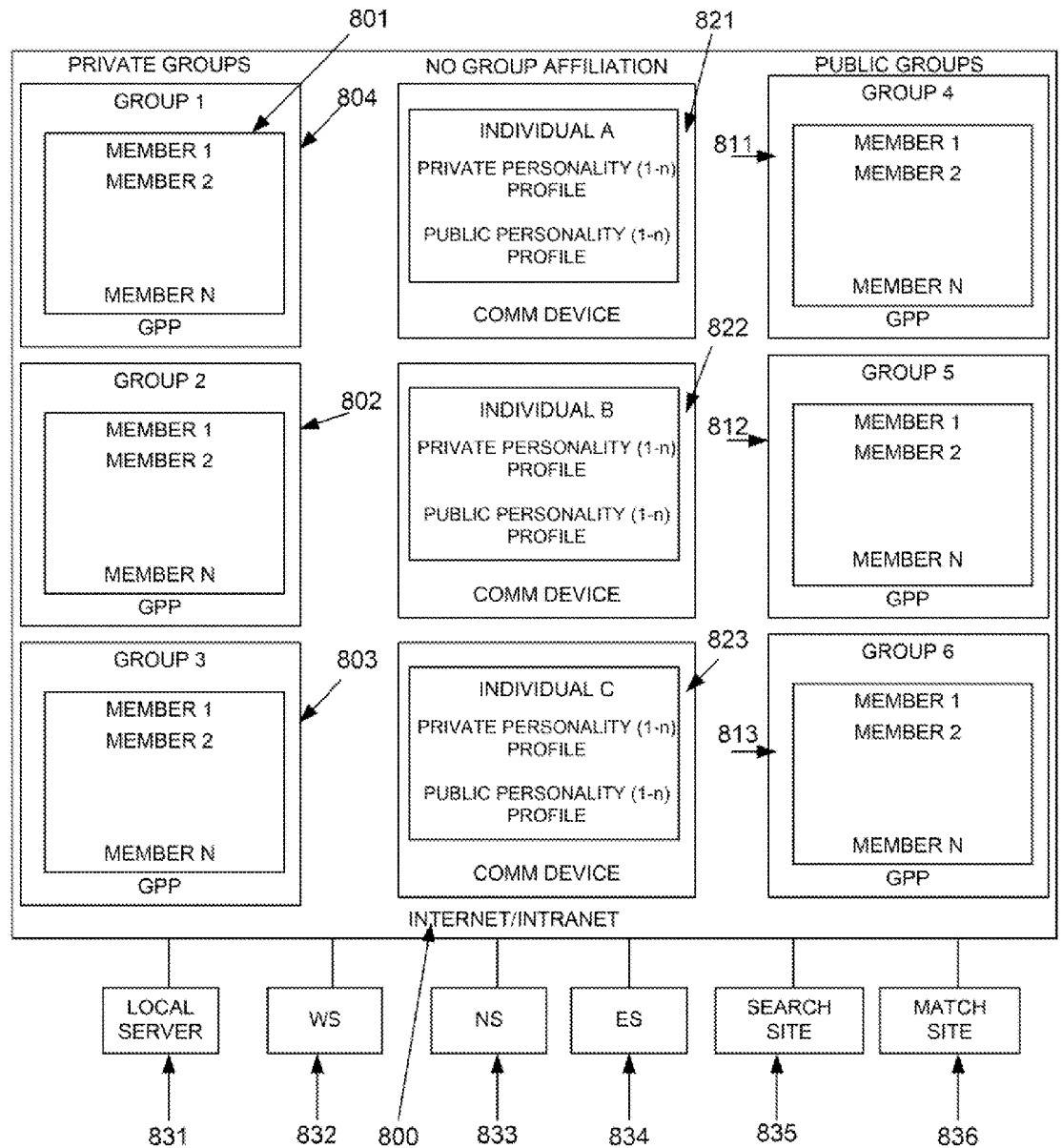
FIG. 8 shows the scheme for individual users to maintain a plurality of private and public personalities and the means for joining one or more private and public groups. The groups are enabled to maintain a plurality of group personality profiles. The invitation to join a group and other management functions between the individual and the groups are managed by direct interaction and or by one or more servers located on the Intranet or the Internet.

FIG. 8: FIG. 8 shows an embodiment of a Matching Network system of the present invention showing the applicability of the system to one or more Groups. In the prior art groups may be formed for the narrow purpose of email communication. However, in the prior art groups are not defined with specific personalities nor characterized and behaviorally modeled with one or more personalities. Additionally, the prior art allowed certain groups to be created for the very narrow purpose of enabling easy e-mail communication within the group. The ability to create Personal Networks and or Group Networks and manage the relationships within the network and between networks is not available to the individual user.

The prior art does not enable matching of individuals, intra group matching and inter group matching of individuals and matching between groups. The prior art does not index groups or the individuals that belong to a specific group. In an increasingly digitally connected world, the importance of personal networks and group networks is extremely critical for efficient communications and transactions. There is a need to find the public groups on the Internet and the moderator of the specific group if one exists. The present invention enables the specific group to be indexed by type, category, by its personality profile and by the moderator for easy searching and matching, and traversal by the individual user across the group and personal networks.

The present invention overcomes this limitation and defines a comprehensive system for forming a Group, developing and establishing one or more personalities for the Group, the means for admitting an individual to the Group and or terminating the individual from the Group based on determining if a match exists between the personality profile of the individual seeking admission to the group and the personality profile of the Group. The present invention also defines the means for interaction between one or more Groups based on the Group personalities.

Referring to FIG. 8, the Internet/Intranet 800 is the medium for wired or wireless communication by one or more individuals or groups, using enabling communication devices, CD. Individual A, 821, individual B 822, and individual C, 823 have no group affiliation but have one or more private and public personalities. Private Group-1, 801, Private Group-2, 802 and Private Group-3, 803 exist on the Internet or the Intranet said groups comprising of multiple individual members each member being defined by their own private and personality profiles. Additionally each group is characterized by one or more Group Personality Profiles, GPP, said group personality profiles being member defined. The Group Personality Profile, GPP is maintained on a hosting Website Server, WS 832, Local Server, LS 831, Network Server, NS 833 or a Match Site/Match Server 836. Additionally, Search Site 835 and Escrow Server, ES, 834 are shown for interaction as needed. Similarly, one or more Public Groups, Public Group-4, 811, Public Group-5, 812 and Pubic Group-6, 813 are enabled with the individual members of said public group having one or more public and private personalities.

Public and Private groups may have a moderator or no moderator. The individual and the members of the group are enabled to utilize their pseudonym ID at the Match Site to communicate without revealing their true identity and or may use their real identity to communicate within the group or with individuals external to the group. The Match Site and its associated Match Engine enable the matching process.

The embodiments and utility of the Matching Network system and its applicability for groups is illustrated with examples:

EXAMPLE 8.1

In this instance Public Group-4 is a Church group in Palo Alto, Calif. the Public Group-4 actively seeks new members who are
1. Christians
2. Volunteers for weekend duties
3. Believe in actively tithing and supporting the Church by giving at least 10 percent of their income.

The above limited information is one part of the Public Group-4 personality profile. Individual A, 821 is an upstanding citizen of Cambridge, Mass. who is planning on relocating to Palo Alto. The Individual is a
1. Christian
2. Likes to volunteer
3. Does not believe in being required to tithe a specific percentage of the income and believes that the support should be voluntary.

The above limited information is one part of the Individual A's Public personality profile. The individual using the current Search Engine technology searches for a Church groups in Palo Alto and is presented with a number of results that may have no results and or require further sifting of the results presented.

However, the Church Group and the individual have registered with the Match Site and or alternately indexed by the Match Site if registered on other sites. The query of Individual A to Match Site 836 enables the discovery of Public Group-4. In this instance a conditional match is indicated based on the conflict on condition 3 of Group-4 that requires tithing. The Group Moderator is the focal point for communication and negotiation with individual A for admission to the group. However, Individual A wishes to mask the identity at this point. In the event the group has no moderator then the Match Site facilitates the polling of the entire group. The groups in the present invention may be polled, if the polling option is selected. The Escrow Server 834 is utilized in the instance critical personality profile information about the Individual A needs to be authenticated independently, without disclosure to the Group Moderator or some or all of the members of the group. Alternately the Group Moderator is enabled to decline the admission of Individual A to the group without disclosing the Group Moderator's identity as the Individual A and the Group moderator are likely to interact in the future in the community on other matters.

EXAMPLE 8.2

Individual B in this instance has one or more public and private personalities and wishes to create one or more private and public groups, with some groups having a moderator and other groups having no moderator. In the present invention, multiple individuals, including B are enabled to create one or more private and public groups using the Match Site, the Match Engine and the Matching Network system of this present invention.

Individual B creates a private group for playing the game of tennis with the condition that only individuals who have played at the varsity level will be admitted. Individual B is a varsity level champion and has friends who are novices but wish to play tennis with individual B. This is not satisfying to B but B needs to be discreet about turning down their offers to play.

1. Using the Match Site, the Match Engine and the pseudonym ID of B at the Match Site, individual B creates a Private Group labeled Varsity Tennis Group. Individual B selects a personality profile for B. Since B is the creator of the group, the group personality profile for the Varsity Tennis Group is defined by individual B. The group is registered on the Match Site. The group is formed with a moderator. In this case B is the group moderator.

2. Individual B now is enabled to directly or anonymously invite known varsity level tennis players to join this group with the option of revealing the identity of B or alternately keeping the identity masked.

3. Individual C is a great tennis player and is invited and accepts the invitation not knowing the identity of B. Individual B is the Moderator all invitations must go through B. If there is no moderator, individual C is now enabled to invite other varsity level players using the masked identity. The new invitees must meet the group personality criteria and must be approved by some or all members of the group. Individual C invites individual D who is accepted if there is a match. Individual C invites individual F who is known to B, but is not compatible with B even though F is a great tennis player. In this instance B declines to admit F. However B invites E, but E is not preferred by C. Then B and C negotiate to 1175 accept E and F or decline both E and F.

4. The individual personality profiles and the group personality profiles are matched by the Match Engine to ensure that the group personality profile is not compromised.

The present invention enables the following unique processes utilizing the communication device and or the appropriate servers located on the Intranet or the Internet.

1. Creation of Private Groups and Public Groups with one or more individuals as members.

2. Enables members to maintain a plurality of private and public personality profiles.

3. Enables the group creator to establish the Group personality profile or a plurality of Group personality profiles.

4. Enables the members to iteratively develop a series of questions and answers to democratically or by other rules establish the group personality profile.

5. Enables the polling of the groups by electronic means on issues relevant to the group by the Match Site 836 or the Escrow Server, 834.

6. Enables the matching of new members for admission to the group by defined rules without disclosing the votes of individual members by using the Escrow Server, 834.

7. Enables the member's profiles to be matched with the group personality profile.

8. Enables the termination of members from the group by defined rules without disclosing the votes of individual members by using the Escrow Server, 834.

9. Enables wired or wireless communication by members with each other and or the servers using various types of mobile and stationary devices.

10. Enables the Group to be moderated by the moderator and or operates with no moderator.

11. Enables the groups to be indexed on the Match Site or other search sites for discovery by the users and for matching the group with vendors and other sites. Alternately enables the groups to remain anonymous.

12. Enables the individual to belong to one or more groups based on the different personality profiles of the individual.

EXAMPLE 8.3

The present invention enables User A, a small business owner, to create a purchasing group for office supplies that will benefit from large volume purchase by the members. The group is created by User A and User A is also the moderator. User A, posts the existence and mission of the purchasing group on the Match site without disclosing the identity, using the pseudonym ID provided by the Match Site. Alternately the User A is enabled to disclose the identity. The group profile is established by User A. The personality profiles of the applicants that wish to join the group are processed by the Match Site for compatibility keeping the applicant's identity masked from User A. The group as an entity seeks information and services from potential office supply vendors with its own group personality profile. Similarly, creation of various groups for other purposes such as bartering, political campaigns and other purposes is enabled with the ability to mask or reveal the identity of the members in a manner that is consistent with the law.

FIG. 9: FIG. 9 illustrates other novel embodiments of the present Matching Network system which includes the Personal Matching Network, Group Matching Network features and Super Group Matching Networks. The Personal Matching Network is abbreviated herein as PMN, the Group Matching Network is abbreviated as GMN and the Super Group Matching Network is abbreviated as SGMN. The Matching Network system enables creation of public and private groups with the group having one or more personalities. The Matching Network system enables invitation of individuals with specific public or private personalities to join a group, for denying admission to the groups, for terminating the membership of individuals from the group, for terminating the group itself, and for moderating or not moderating the group. These novel embodiments are explained with reference to personal matching networks and group matching networks and their inter relationships.

1. Structure of Personal Matching Networks

The Matching Network system of the present invention enables the novel method for the creation of the PMN by the individual user, comprising of multiple individuals with who the user interacts socially, professionally and or in other ways. In essence the user is enabled to create a personal network consisting of many individuals and groups. The individual user has a plurality of private and public personalities and for each personality the user is enabled to create a sub network comprising of other individuals/groups that fit and match the particular personality profile of the user. The PMN for the individual is comprised of one or more individuals; and one or more of these sub networks. The concept of a match includes the no match instance, since the no match is easily denoted, represented and grouped and has special utility for the user in certain applications.

The Personal Relationship Management, PRM, software utility enables the user to readily establish, review, evaluate and manage relationships with one or more users in a bilateral manner, in sub-sets, in sets, and as groups. The user is additionally enabled to establish the Personal Routing Protocols, PRP to ensure that the user receives the quality of service for the personal network desired. The full PRM and PRP utility or a subset thereof is enabled to exist on the Communication Device, CD, the Local Server LS, the Network Servers NS, the Matching Server and other Servers located on the Intranet or the Internet.

Referring now to the FIG. 9, Individual User A forms a Personal Matching Network, 900 comprising of individuals I-1, I-2 and I-3 who are organized by the User A into subnet A1, 901, said subnet conforming to a specific private or public personality profile. As an example subnet A1, 901 could be the golfing buddy group. The other individuals, and I-9 are the family members represented by family subnet A2, 902. The Individuals I-4, I-5, and I6 are not part any subnet for A but are part of A's Personal matching network. User A is a member of the group, G-1 which is shown as part of User A's personal matching network. The User A is part of the Group-1 as a result of the Individual to Group Matching protocol process, 926 which enables the invitation, mutual query/answer processes, the interaction and negotiation for admission to the group using the appropriate Local Server LS 930 and or the Network Server 931, the Matching Server 932 and or the Escrow Server, 937. User A is enabled to belong to multiple groups.

Referring once again to the FIG. 9, Individual User B has similarly formed a separate Personal Matching Network, 910 comprising of a subnet B1, 911, that in turn consists of individuals I-10, I-11 and I-12; and another subnet B2, 912, consisting of individuals I-16, I-17 and I-18. The individuals in each subnet are matched to User B based on one or more of the User B personality profiles. Consequently each subnet is characterized by a specific personality profile of the User B. The individual I-13, I-14 and I-15 are members but are not part of a subnet.

Additionally User B belongs to the groups, G-2 which consequently is part of User B's Personal Matching Network, as a result of the Individual to Group Matching protocol process and negotiation which are based on the personality profiles of the User and the Group. User B is enabled to belong to multiple groups.

User A and User B may not be directly part of each others personal matching networks even though they share the commonality with one or more groups. To establish a mutual relationship User A and User B are enabled to initiate the Individual to individual Matching protocol process, 905 and negotiate a mutual relationship based on the specific personality profiles selected by User A and User B. User A and User B are enabled to directly communicate with each other using the wired or wireless communication path 914 and communication device 903 and 913 respectively. User A is enabled to communicate via wired or wireless path 906 and similarly User B is enabled to communicate with path 915, with the Local Server 930, the Network Server 931, the Matching server 932 and the Escrow Server 937 to execute various functions and utilize the software and computing power resident on these servers. The User A and User B are enabled to utilize the Personal Relationship Management, PRM software and the Personal Routing Protocol PRP, resident on the communication device itself and or the servers to manage the full range of personal and group relations comprising their individual Personal Matching Networks.

2. The Structure of the Group Matching Network.

Referring once again to the FIG. 9, another novel embodiment of the present invention is illustrated that relates to the unique method wherein the Group Matching Network, GMN, is formed comprising of one or more individuals. Group-1 forms a GMN 920, having members M1, M2, M3, M4, M5, M6, M7, M8 and User A. The GMN 920 is structured with a moderator M1. Another Group-2 forms a GMN 922, having members M2, M8, M9, M10, M11, M12, M13, M14 and User B. The GMN 922 is structured with member M2 as the moderator. The GMN 920 may further be composed of sub groups where certain individuals are organized by the moderator to form the Group Sub Net 927. The illustration shown is with the moderator option but the application is equally applicable to groups that have no moderator. The groups may be private or public groups with a specific group personality profile or alternatively multiple personality profiles. The GMN 920 and GMN 922 are enabled to have one or more private and public personality profiles with the ability to invite/negotiate and admit/terminate members to each group based on the personality profiles.

The interaction between the groups G-1 and G-2 that is GMN 920 and GMN 922 is implemented in association with the communication devices used by the moderator M1 and the moderator M2, the local servers 930 and or one or more of the network servers, 930, 931, 932, and 937 using the communication path 924, 906 and 915. The Group-1 to Group-2 relations are managed by the moderators M1 and M2 utilizing the Group Relations Management, GRM, 933, software resident on servers located on the Intranet and or the Internet, 950.

The Group Relationship Management, GRM, software utility and the Group Routing Protocols, GRP, 933 enable the Moderator to readily establish, review, evaluate and manage relationships with one more members in a bilateral manner, in sub-sets, in sets, and as groups. The full GRM and GRP utility or subset thereof is enabled to exist on the Communication Device, CD, the Local Server LS, the Network Servers NS, the Matching Server and other Servers located on the Intranet or the Internet.

3. Structure of the Super Group Matching Network:

Referring now to the FIG. 9, the Super Group Matching Network, SGMN 923, comprises of the Group Administrator GA and the groups G-1, G-2, G-3, G-4, G-5, G-6, G-7 and G-8. These groups may be similar or disparate in character but may be organized as a network for one or more specific purposes and administered by the GA. The group administrator, GA is enabled to establish one or more personality profiles for the super group network and invite and admit the separate groups to join the super group network, SGMN 923. The GA enables one or more groups to form a Super Group Subnet, 928 comprising of G-1, G-2 and G-3. The GA is enabled to communicate with the group moderators such as M1 and M2 by communication path 925 and with the local and network servers by the communication path 924. The Group Administrator, GA, is enabled to manage the Group Network and or the sub nets by utilizing the wired or wireless communication device itself and or utilizing the software, databases and processing power resident on one or more servers located on the Intranet or the Internet.

The Group Relationship Management, GRM, software utility and the Group Routing Protocol software enables the administrator to readily establish, review, evaluate and manage the relationships with one or more groups in a bilateral manner, in sub-sets, in sets, and as groups. The full GRM utility or a subset thereof is enabled to exist on the Communication Device, CD, the Local Server LS 930, the Network Servers NS 931, the Matching Server MS 932 and the Escrow server ES 937 located on the Intranet or the Internet. Examples of the super group networks are professional networks, medical networks and others comprising of one or more groups.

4. Relationship Mining:

The GRM and GRP software, 933, provide a routing map for the members of the group to reach a target individual or target group in a manner similar to the one described for the PRM and PRP software, 934. The GRM and PRM software enable relationship mining and or exclude members from relationship mining efforts by the other members and the group administrators, based on the personality profiles and permissions set by various members. In the highly digitally connected and networked world of the future, there is a need to dynamically patch in new members into the personal and group networks and or dynamically exclude members and stitch a new network topology. In addition the ability to determine the relationships and also the ability to shield the relationships is of great importance.

5. Subnets in Personal, Group Matching Networks and Super Group Matching Networks The present invention enables users to define PMN, GMN and SGMN networks comprising of multiple subnets for each of the personality profiles of the user/members/groups respectively. Each subnet is enabled to have a personality profile associated with the subnet. The Matched subnets in each case comprise of individuals/members/groups having the particular personality profile desired by the configuration selected. The Unmatched subnet is by default or by selection comprises of unmatched individuals/members/groups. An example of a matched subnet is that of drinking buddies for a male user A. An example of an unmatched subnet, in the event User A wishes to designate it as such, is the friends of the user A's wife. By analogy the subnets for the Group Matching Network are enabled. The subnets are useful in forming a social network, a professional network and various other special purpose networks, these subnets being part of the PMN, GMN and SGMN. Referring to FIG. 9, the illustration comprises of the following subnets; the subnet 901 in the PMN 900 of User A, the subnet 911 and subnet 912 for the User B, the group subnet 927 for the group G-1 and the super group subnet SGMN 928 in the super group 923.

6. Invitation and Admission to Personal Matching Networks and Group Matching Networks Admission to the personal matching network of A requires at least the following conforming to the various enabling methods described in the present invention.

a) Invitation by the User A (and or by invitation by other individuals that are part of the User A's personal network.)
b) Matching (by default includes no match instance) c) Negotiations) Approval by the User A e) Admission to the PMN of A Similarly, the personal matching networks for User B and others are formed consisting of a plurality of members. Similar procedures are followed for the group networks and super group networks. The Invitation List of each user is of relevance in determining the levels of connectivity across personal and group networks. The invitee list is composed of those that have been invited and admitted and also those that have been invited and not admitted or declined. The ability to notify the full set of the Invitee List or only the admitted set of the invitee list is up to the discretion of the User. As an example dynamic changes in the personal and group network topology may cause others that were invited but did not join to change their mind 7. Connectivity Rules The network of interconnections between the individuals in the personal matching network of A defines the Network for A. The network of interconnections between the individuals in the personal matching network of B defines the Network for B. Individuals are related to user A at a certain degree of connectivity depending on how many hops are required to traverse from one user to another user through each user's invitee list of connections, in this simple case the invitee list of User A and User B. As defined herein, the Invitee List is by default the membership list of each network. The individuals that declined the invitation to join or the individuals that were rejected by the User are maintained in a separate database for future utility. The connections dramatically increase based on the membership in each personal network and the degree of connectivity desired across these personal networks. As an example User A is enabled to traverse through many PMN networks and GMN networks to discover another individual and or group which match the user's specific personality profile or goals. The illustrations for the PMN are by analogy applicable to GMN and SGMN networks.

7.1 Permissions.

User A is empowered to discover the profiles of other users such as members in the network of B only if B or the specific members in the network of B have enabled the discovery provision. Thus the ability to view the personality profiles of other members is enabled to a specific degree of connectivity and even that only with permissions and by the use of the Access Control List. Thus each hop has an access control list associated with it.

7.2 Access Control Lists.

Alternatively, User B has the option to define an, Access Control List that permits or denies certain specific users or certain types of users the access based upon their personality profile. Thus B has the option to permit access to A for all of user B's network of invitees or part of user B's network. Thus user B has the ability to define in this access control list the rules and permissions for viewing user B's list of invitees and members. The users in the personal matching network have the ability to choose an anonymous profile and remain masked. By analogy, the foregoing is equally applicable for the Super Group which is the group of groups. The Group Matching Network consists of a number of personal matching networks. Groups are also connected at a number of degrees of connectivity. The Group moderator is enabled to define access control lists that permit or deny traversal from one group to another. The foregoing and following methods of implementation and management of the networks is enabled by the PRM, PRP, GRM and GRP software, the rules processor for each user and the match engine.

8. Personal and Group Matching Network Implementation

A central challenge in a Personal Matching Network or Group Matching Network is determining the connections between individuals or inanimate entities that may be a part of the Personal Matching Network or Group Matching Network. There may be millions of connections between people at only five or six degrees of connectivity.

In one embodiment of the present invention the ability to build an entire network per node, where in a node could be an individual or a group is enabled. As an example, an exhaustive discovery is performed for a specific node by device discovery or methods using the Matchbot. The connectivity database is maintained and presented to the users based on permissions indicating permitted nodes and blocked nodes. This network determines the nodes that are enabled to be viewed at a certain degree of connectivity. The connectivity map is constructed with depth first or breadth first methodology. Either method requires large database transactions, lookup table operations, storage processing and other processing which are enabled by the web server/network server. However, since a large number of users desire this information contemporaneously the present invention teaches methods for efficient execution.

One example of the implementation is to limit the database transactions to just the invitee list of users that are proximately connected by a defined degree of connectivity in the network. In this implementation, each user informs just those individuals in the User's invitee list of changes to the User's personal network. The User may do this update on some periodic or instantaneous interval. Other connected individuals send the same update message to their invitee list. Only upon a change occurring to the network, does the chain reaction of message traverse and update the entire network. In this manner, each node maintains an accurate snapshot of the network by listening to messages that are directly connected to it. The update messages in one scenario can be propagated only due to a log in or log out of a particular user at a website such at the Matchsite that facilitates management of personal and group matching networks. Thus a user in this type of implementation only sends a propagation update message to the Users invitees upon logging in to the system or logging out of the system. Alternate propagation criteria may be enabled to modulate the chain reaction of message updates.

In another example of the implementation, is to cache the connectivity results into a Connectivity Database. This connectivity database speeds up access to the connections between nodes in a Personal Matching Network or Group Matching Network. A cache of recently accessed nodes or the individual's profiles allows for a more efficient system. Alternatively, heuristics are used to prioritize certain profiles in the connectivity database which describes the connections between the nodes or individuals. These heuristics enable the user to see the profiles of others located on the network, at pre-determined degree of connectivity from the User, based upon the User's personality profile criteria. The User is enabled to be matched with those individuals that are within the same degree of connectivity from the User and are therefore part of the connectivity database.

The Personal Matching Network or Group Matching network nodes are composed of individuals, web sites, or products and services. These nodes each have personality profiles. A hierarchy of connections determines their relationships. Properties such as rules or access control lists that permit or deny traversal are associated with the edges that connect these nodes. In the case of a Personal Matching Network, that consists of people the edges are listed in the invitee list of each individual. Certain properties and attributes may be associated with each invitee list.

In Personal Matching Networks and Group Matching Networks, entire connections between users have the ability to be grafted or pruned. It is possible for a user to be a member of multiple groups and have multiple identities. When a user joins a Group, all of his interconnections to the group are grafted on to his invitee list if the user has permitted such grafting. The user has the ability to decide whether to expose the user's connections to this group and the other members of the User's invitee list. The ability of the user to preserve the integrity of the user's personal network is another crucial, important and unique feature of the present invention.

The Personal Matching Network and or Group Matching Network code has the ability to be deployed on the communication device and or in conjunction with the local server/network server or in a peer to peer manner. The peers may discover each other using Matchbots and establish connectivity.

Example of the Degrees of Connectivity in the Personal Matching Network

The nodes are individuals in this case and the edges that connect these nodes are all or a subset of the individuals on the invitee list. To demonstrate the method, assuming there are three users Bob, Jane and Jack each wishing to build their own personal matching network. Jane and Jack each wishing to build their own personal matching network.

| User: | Invitee List: |
|---|---|
| Bob | |
| Jane | |
| Jack | |
| Jack invites Jane | |
| Bob | |
| Jane | Jack |

| User: | Invitee List: |
|---|---|
| Jack | Jane |

At this point, Jack is related to Jane at one degree of connectivity.
Next, Jane invites Bob.

| | |
|---|---|
| Bob | Jane, Jack-2ndDegree |
| Jane | Jack, Bob |
| Jack | Jane, Bob-2ndDegree |

Jack is related to Jane at one degree of connectivity. Jane is now related to Jack and Bob at one degree of connectivity. Bob is related to Jane at one degree of connectivity.

Jane then sends a propagation message update to Jack informing him of her first degree connection to Bob. This translates to a second degree connection for Jack and he stores this connectivity information in his invitee list while denoting that the connection is a second degree connection. Bob performs a similar operation.

By increasing the frequency of propagation messages, the accuracy of the system increases. An alternative mechanism is to only keep track of first degree connections and perform an exhaustive, recursive traversal through each individual to build a connectivity database. This connectivity database can determine the connections between individuals or inanimate objects. The connectivity database can also determine the number of connections that exist at each degree of connectivity.

A mobile user uses the connectivity database in conjunction with a Mobile Device to discover his connection if any to another user. The user determines the exact route or hops between the user and the other user. This mobile user performs the same route lookup to determine relationships between any two entities that are in a Personal Matching Network or Group Matching Network.

The Personal Matching Network and or Group Matching Network implementation and software functionality is capable of being deployed on a network server or deployed in a peer to peer manner between the users. The peers are enabled to discover each other using Matchbots and establish connectivity via communication devices.

9. Quality of Connectivity

The User is enabled to determine the first degree of connectivity, the second degree of connectivity, the third degree of connectivity and so on to the Nth degree of connectivity from the User to the intended target individual that the user wishes to reach. In addition the User is enabled to look at the complete topology of the User's Personal Matching Network and other Group Matching Networks to determine the nodes, the individuals, intermediaries, the groups, the subnets and the super group networks that the user must traverse through to efficiently contact and communicate with the intended target individual. The PRM software provides a dynamic routing map for traversing from the User to the target individual or target group computing the least number of hops, a hop being another user or another group, and or the most efficient routing path.

The least number of hops to the intended target is in some instances not the most desirable routing since the personality profiles of each hop is critical, since some individuals who may serve as a hop may have an undesirable personality profile that would result in the routing path being terminated at this hop or the routing path loosing its fidelity and being compromised. Thus the routing map is also modeled using the personality profiles of the User and also that of the nodes of traversal to suggest the optimal routing using one or more of the user defined routing protocols and the quality of connectivity desired by the user. The unique method wherein the personality profiles and the behavior models of the hops/nodes are determined enables the optimal routing path to be selected by the user and modeled to provide the desired quality of connectivity. As an example, a particular node could easily sabotage the routing path selected either willfully or by simple delay in response. The most critical factors are not how many people you know and or how short the routing path is. The routing path is therefore modeled by the PRM and GRM software to the user defined criteria that includes the anonymity features, the fidelity and quality level desired and the time domain response desired.

Another unique and novel embodiment of the present invention enables the Personal Matching Network and The Group Matching Network features to be coupled with the location determining capabilities of the global positioning system, maintained on the Network Server 931 or other servers, to determine geographical and location specific proximity to the intended target. Additionally, the mutual discovery of the communication devices used by the individual and the target is enabled to determine the most efficient means of communication across these personal and group networks. The personal and group networks are modeled using advanced networking technologies combined with human behavior models, individual personality profiles and group personality profiles.

10. Communication Mechanisms in Personal and Group Networks

Various communication mechanisms are enabled between individuals in a Personal Matching Network, Group Matching Network or across different networks. Individuals are enabled to communicate via message boards, exchange of images, exchange of audio, exchange of text, exchange of email, exchange of real time audio, exchange of real time video, exchange of personality profiles, exchange of money, exchange products and or services, exchange of real time text including chat and instant messaging among other communication schemes. Users have the ability to multicast or broadcast polls and questions to the entire personal or group matching network. The Group moderator regulates these communications to the groups by approving or disapproving of individual communications or defining access control lists and or rules maintained in a rules processor to regulate these discussions. The individuals connected in a Personal Matching Network or Group Matching network have the ability to authenticate each other and thereby establish credible interaction. The matching software enables individual users in a Personal Matching Network to serve as a reference in any communication or electronic commerce transaction between members of a Personal Matching Network or Group Matching Network.

11. Applications in Commerce and Barter:

Individuals in a Personal Matching Network or Group Matching Network use their credibility to barter and or sell products and services to one another. A match is enabled between the personality profiles of the individuals and the personality profiles of the products and services they desire to sell. If the seller with a known profile of a used car salesman is attempting to sell diamonds, then this is a relevant factor towards determining credibility. The individuals in common to both parties have the option of serving as a reference and establishing the credibility of the buyer and seller. The individuals in common to both parties have the ability to serve as the escrow agent. Alternatively, the escrow server provides escrow features in the exchange of products, services, and money.

EXAMPLE 9.1

Health Care Applications

The Question-Answer creator and personality profile creator of FIG. 5, the mutual ability to query and track the answers described in FIG. 6, the Matching Engine and the Personal and Group Relations Management software are of utility for health care applications. Individuals using this infrastructure are able to obtain second opinions from doctors using mobile communication devices and the Internet. The present invention enables the user to interact with the doctors, dialogue with these physicians, and exchange personality or medical profiles for getting better care. The diagnosis by medical professionals is based on the query process wherein a number of relevant questions are asked and answers solicited.

EXAMPLE 9.2

Career Matching, Employer-Employee Interactions

The Question-Answer creator, Matching Engine, and Personal and Group Relations Manager have the potential to provide career matching and career counseling services to individuals. Individuals using this infrastructure are able to determine career opportunities available to them in their Personal Matching Network and Group Matching Network. They are able to complete an assessment of their skills and provide these to employers with transparent or masked identity and negotiate a relationship. As an example the employer is enabled to provide a test through the employer's Website, the Match Server and or the Escrow Server. The user takes the test with the escrow server masking the identity and when the user has met the full criteria of the employer and the user are notified of the results. At this point the negotiation between the parties is enabled.

The foregoing embodiments are novel and unique and are of great utility for the new behavioral Web or the Internet since the present invention discloses a means for characterizing each individual with a plurality of private and public personalities and also characterizes Groups with a plurality of personality profiles, thus enabling the matching and the administration. The PRM and GRM management software enables the individual user, the Group Moderator, and the Group Administrator to fully analyze and manage different types of personal and group networks. Additionally, the PRM, PRP, GRM and GRP software is enabled to recognize the specific communication device profiles and work in tandem with one or more personalities of the users, communication devices, servers and Intelligent Appliances.

Figure 10:
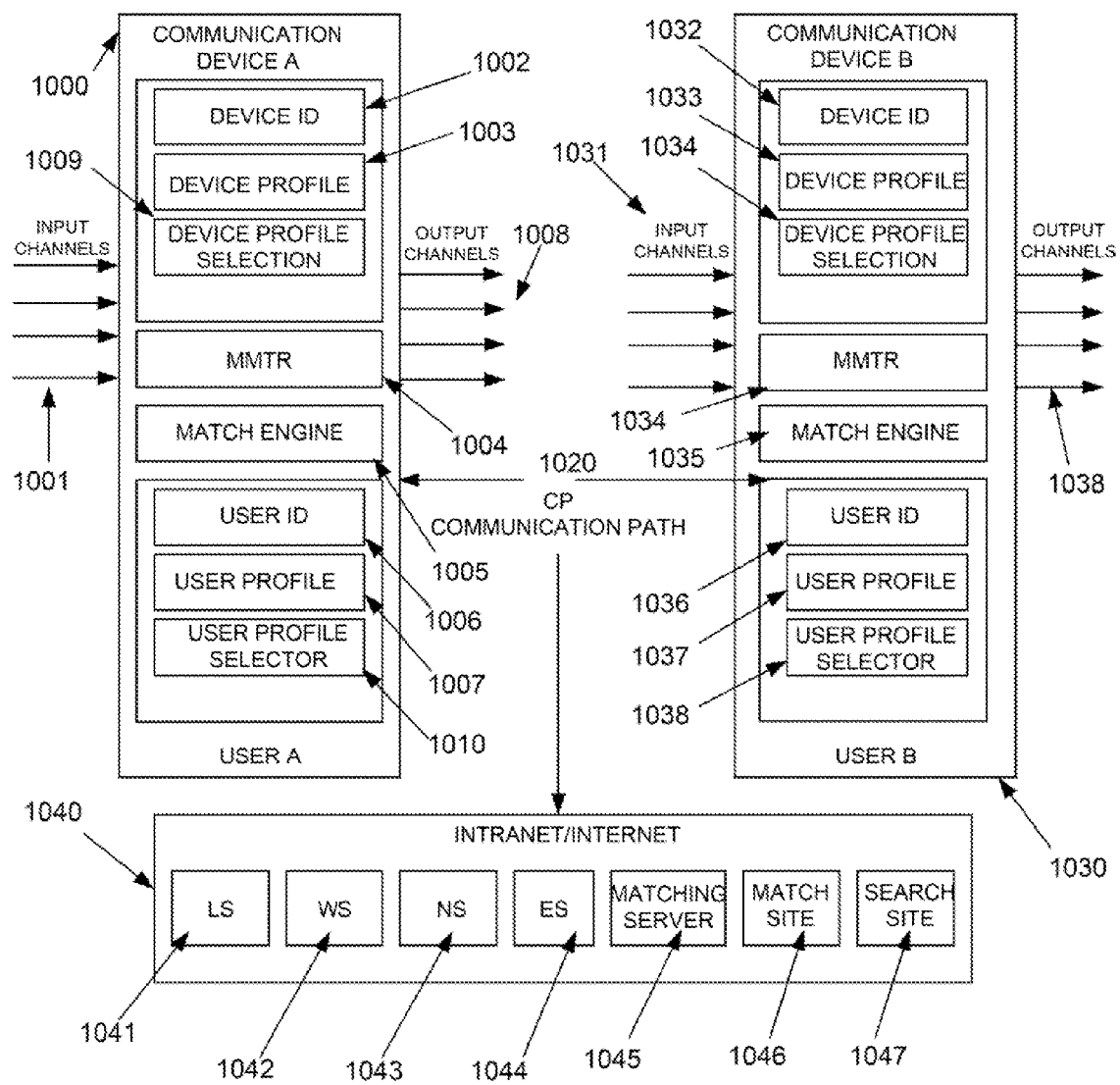
FIG. 10 shows the system scheme wherein the communication device of User A and User B to comprise of one or more channels of Inputs and Outputs for communication. The Multi Channel Multiplexing Transmitter and Receiver, MMTR, is used to enable the communication on one or more channels of input and output. Alternately other methods may be used to control the I/O channels. The communication device is configured to comprise of Device ID, Device Profiles, Device Profile Selector, MMTR, the Match Engine, User ID, the User Profile Selector. The communication device connects via wired or wireless means to the Local Server on the Intranet, and the Matching Server and the other servers located on the Internet.

FIG. 10: FIG. 10 illustrates other novel embodiments of the present invention, the Matching Network system, which includes the ability to establish a plurality of private and public Device Profiles implemented in hardware and or software residing on the Communication Device itself and or resident on the Local Server/Network Servers. The Device Profiles are enabled to be associated with the communication device User's Personality Profiles delivering another enhanced level of personalized and secure communication.

Referring now to the FIG. 10, User A utilizes a Communication Device A, 1000 that comprises of Device ID 1002, Device Profiles 1003, Device Profile Selector 1009, means for transmitting and receiving on one or more channels of communication, the MMTR or other means 1004; the Match Engine 1005, User ID 1006, User Profiles 1007, User Profile Selector 1010, Input Communication channels 1001 and Output Communication channels 1008. Similarly, User B utilizes a Communication Device B 1030, that comprises of Device ID 1032, Device Profiles 1033, Device Profile Selector 1034, means for transmitting and receiving on one or more channels of communication, the MMTR or other means 1039; the Match Engine 1035, User ID 1036, User Profiles 1037, User Profile Selector 1038, Input Communication channels 1031 and Output Communication channels 1038. The wired or wireless communication paths are indicated by CP 1020. The Local Server, LS 1041, the Website WS 1042, the Network server NS 1043, the Escrow Server ES 1044, the Matching server 1045, the Match Site 1046 and the Search Site are located on the Intranet or the Internet 1040. While multiple servers are shown for illustrative purposes it is understood that the functionality and the scheme of the present invention may be executed by a single server. Such combination is not to be construed as limiting the invention. It is also understood that the MMTR is one means for implementing and managing multiple channels of inputs and outputs and other means such as implementing the Transmit and Receive functions by replication of multiple channels are not to be construed as limiting the novel elements of the present invention.

The present invention enables the registration of a plurality of Device IDs with the communication service provider's network server 1043, enabling a single communication device to be utilized for multiple personalities with each personality having a specific Device ID for a single user, or alternately enabling the same device to be used by multiple users with each user being able to select a specific and unique Device ID from a plurality of Device IDs using addressing schemes such as IPv6. The present invention also enables the same communication device to be used by one or more users with each user having a specific User ID that is then associated with one or more Device Ws. Another significantly unique embodiment of the present invention is the means for associating the Device ID and the User ID with one or more private or public personality profiles of the user enabling the discovery of one communication device by another; and one user by another. The cross correlating table of Device IDs, User IDs and Personality profiles for the User A are stored in a Database or a Lookup Table and compared with the data for User B to determine a match and execute an action.

The present invention anticipates the need for the User to establish and select a plurality of communication device profiles for efficient and secure communication based on the requirements of the specific type of communication. For example, the User A is enabled to select one or more input and output channels for private or public communication. Additionally the User A is enabled to select and associate different types of communication protocols for each communication device and each input and output channel. The User A is enabled to select the wireless frequency band and the appropriate power level for each input and output channel. Alternately the device profile selections may be executed automatically based on dynamic conditions. The device profiles are enabled to be programmed for geographic location that may require different communication protocols for the region. Similarly User B is enabled to establish and select same or different communication device profiles. The device profiles and input/output channel selections are also driven by technical considerations such as the need to switch the frequency band due to a change in reception or change in service provider. The signal to noise ratio is adjusted for achieving better communication between devices by adjusting the power level on one or more channels and channel hopping.

The Transmit/Receive and other radio frequency related functions of the communication device are implemented using hardware. However, the present invention in addition utilizes the software radio technology, with the APIs and the software radio functionality being resident on the communication device itself, such as in the Multi-channel Multiplexing Transmitter and Receiver, the MMTR or other means; and or on the Intranet or the Internet Servers. The present invention leverages the high speed connectivity, the processing power of the communication device itself and or the local or network servers to enable the software radio implementation. This implementation enables User A and User B to be discovered and dynamically matched for secure and efficient communication utilizing the Device Relations Manager, DRM. The DRM is a software management utility for managing interaction between communication devices based on the Device Profiles. The DRM software is enabled to reside on the communication device and or the local/network servers. The DRM enables the discovery of the communication device in totality that is all the I/O channels and personality profiles of User A by User B; and or the discovery of only the designated channels and personality profiles of the User A by User B. The user is enabled to designate certain I/O channels as public and others as private on a multi channel communication device; and or multiplex a single channel for the designated plurality of uses. Communication between devices is enabled for specifically matched communication devices based on device profiles and user profiles and the relevant personality profiles of the user.

The present invention by the use of the MMTR or other hardware/software implementation enables each communication device to send a periodic Device and Service Discovery signal, DSD signal on one or more designated channels to discover other communication devices and or matched Service providers. The DSD signal comprises of wired or wireless communication means inclusive of RF, Wi-Fi, Bluetooth, Infrared, wireless USB, Session Initiated Protocol, SIP and other means. Without specific dialing from one device to another device discovery is made automatically when the DSD signal of the device of User A is recognized by the device of User B. The mobile device users, service providers and intelligent appliances are enabled to send the DSD signal periodically, enable or disable the signal and block the signal in the even they do not wish to be discovered. This enables the determination of whether the other communication devices/service providers are matched enabling secure and efficient communication and or negotiation in the event there is no match indicated. The DSD signal matching function is performed by the Match Engine at the communication device level and or the Matching Server or the Escrow Server level using the rules/algorithms defined/selected by the Users. These embodiments of the present invention enable the discovery of other Intelligent Appliances and the speedy and automatic transition of the User from one environment to another environment such as from a home to an automobile, from the automobile to the office, from the office to the automobile and from the automobile back to the home using a single communication device as a enabling tool. In this system configuration, the user is also enabled to contact the other users or providers without necessarily going through the wireless service provider by utilizing direct software radio technology and using the direct Transmit/Receive capabilities of the device.

In another embodiment of the present invention the Match Engine located in the communication device enables the discovery and use of wired or wireless applications that are best suited and matched to the user on one or more communication channels of a multi channel communication device. Alternately, the communication device may comprise of a Multi Channel Multiplexing Transmitter and Receiver, enabling the input and output channels to be multiplexed based on the best match at a given time for a particular application. The Match Engine provisions different types of user requested services on the appropriate communication channel.

Figure 11:
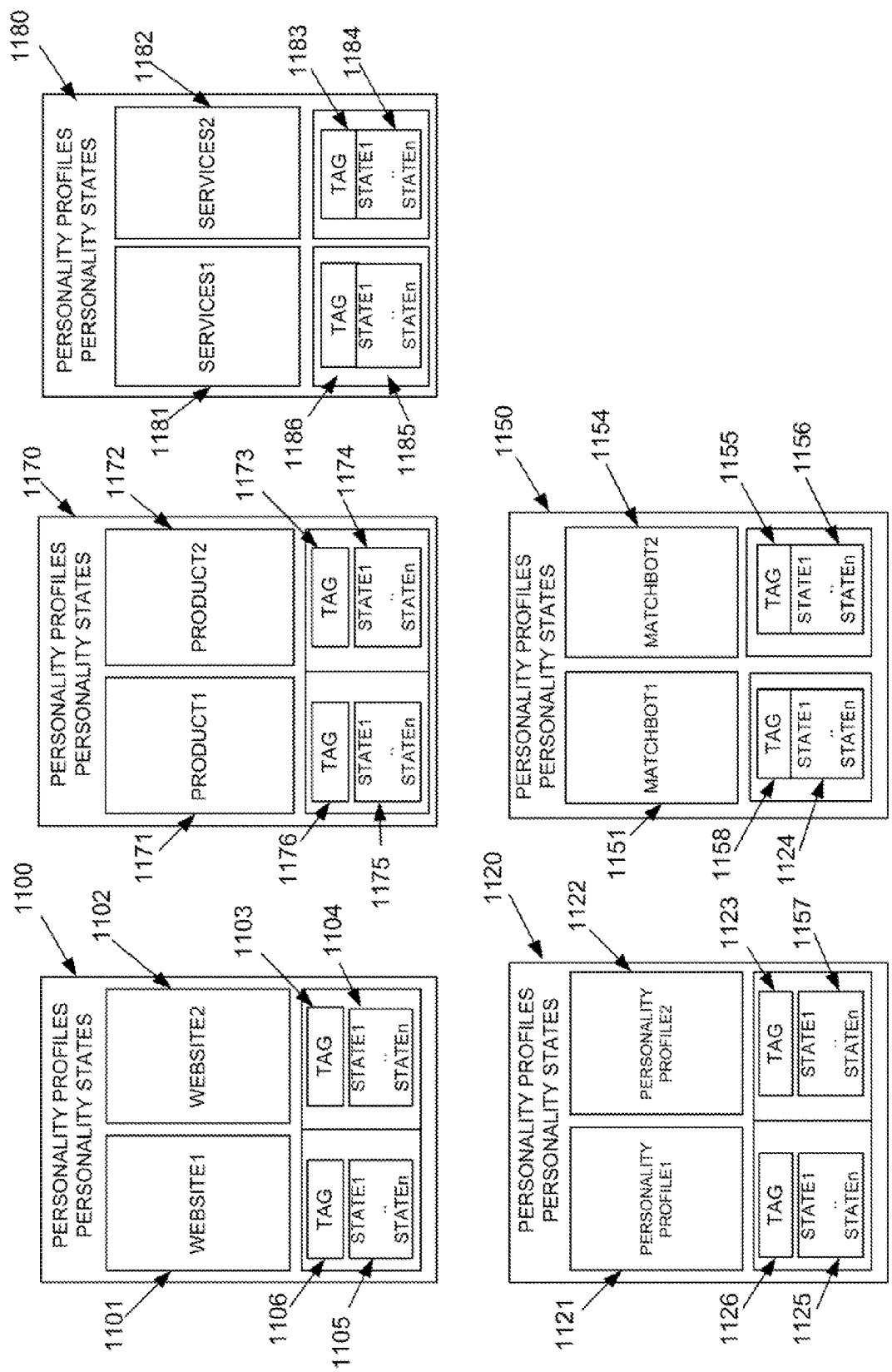
FIG. 11 shows the means for the User, the Website, the Web pages, the Matchbot, and Products and Services to be defined by the personality profile and the associated TAG for easy recognition on the Intranet or the Internet. Additionally the figure shows the ability to hold one or more personality states.

FIG. 11: In another embodiment of the present invention the User, the Website, the Web pages, the Matchbot, Products and Services are characterized by one or more personality profiles. The personality profile is in turn tagged by means of the TAG for easy recognition on the Intranet or the Internet. Additionally the figure shows the ability to hold one or more personality states. Referring now to the FIG. 11, the Websites 1100 on the Internet such as the Website 1101 and 1102 are characterized by one or more personality profiles. The Website 1101 is characterized by the TAG 1106 and the Website 1102 is characterized by the TAG 1103 for easy identification by the Machbot 1150, 1151 and 1154. The scheme is equally applicable to different web pages in a particular website, wherein each web page is enabled to have a personality profile and hold a state. The User 1120 is enabled to have a plurality of personality profiles, 1121 and 1122. The User for Personality profile 1 has a TAG 1126 and personality states 1125. The User for Personality profile 2 has a TAG 1123 and personality states 1124. The Matchbots 1150 comprises of two distinct Matchbots, Matchbot 1151 and Matchbot 1154. Matchbot-1, 1151 has TAG 1158 and personality states 1157; and Matchbot-2 has TAG 1155 and personality states 1156. The products 1170 consisting of two distinct products, Product-1, 1171 with TAG 1176 and personality states 1175; and Product-2, 1172 with TAG 1173 and personality states 1174. Similarly Services, 1180 consisting of Services-1 1181 with TAG 1186, personality states 1185; and Services-2 1182 with TAG 1183 and personality states 1184.

The following description and examples illustrate and teach the embodiments of the present invention:

1. Application for Users:

User is enabled to maintain a plurality of private and public personalities. The User is enabled to select a particular personality profile and associate the TAG with the profile. The TAG is a short description of the specific personality profile type and it is written in XML or other formats for easy recognition by the Websites, Matchbots and other entities. In addition the many features of the personality profile may be held as one or more States, using finite state machine logic techniques.

As an example the User is a surgeon, who selects and holds the professional personality profile 1121 of a surgeon, a TAG is associated with this personality 1126, which in essence is a short descriptor for recognition by other users, websites, match sites and Matchbots. The TAG does not disclose the identity of the user. A large number of TAG types are available for different personality profiles such as homemaker, teacher, plumber, gardener and others. In addition the user may select and hold different personality states within this profile of a surgeon. An example of a state-1 is: enable recognition by other surgeons and exclude recognition by medical sales representatives. A state-2 may be held as: enable recognition and communication with the chief surgical resident at the hospital. A state-3 may be enable recognition by the hospital administrator. Similarly the User is enabled to select a different personality profile-2, and a different TAG 1123 which describes him as individual user. In this example, the surgeon as an individual holds a plurality of states for communication with others. The surgeon may hold state-1 for online shopping, a state-2 for a specific website, a state-3 for drinking buddies and other states. In addition the state holding function is enabled to describe the user uniquely so that the specific personality profile is recognized by the website for a personalized website experience that is distinctly different from other users. The User has the option to have no TAG associated with a profile and hold no state. The TAG types may be defined by industry convention and common protocols such that a number of different personality profile types have associated with each of them a specific TAG. Thus different users may be described by the same TAG type for the same type personality profile. Alternately, the TAG is enabled to be uniquely described by the user, with the information desired by the user, using XML for easy reading and recognition by other users and websites.

2. Application for Websites/Web Pages:

The website and the individual web pages are enabled to have different personality profiles, TAG and hold state. The prior art does not enable a user to experience a personalized experience when visiting a particular website. The experience is same for all users. The website recognizes the personality profile TAG of the user, in this example a surgeon, who is visiting the site and automatically reconfigures the entire website or some set of the website to conform to the personality profile of the surgeon. In addition once the reconfiguration is executed the individual web pages, links and functionality are structured to meet the requirement of this user profile. In this case the website, the web pages, links and functionality can be held in one or more states. When a different user with a different personality profile, visits the website, the website now assumes a different website personality profile and responds to the new user. The TAG of the website may be recognized by the user as the user navigates the web and enables the user to skip the website. As an example pornographic websites may be required to carry a unique TAG. The website TAG when recognized by the user TAG enables the user to immediately skip the website. Alternately, the website is enabled to recognize the TAG associated with the personality profile of a minor and block the contents from being accessed by the minor. The option of selecting and setting the TAG is at the user discretion and the website discretion respectively.

3. Product and Service Applications:

The attributes of the Product and or the Service are characterized by one or more personality profiles. Thus a Product may be described by its technical specifications in addition to attributes such as color, shape, size, weight and others. Hence a product or service is enabled to have one or more personality profiles. Each personality profile is characterized by the TAG and one or more states. An example of the product state is the color, normally available in red, white and blue but currently the state held is blue which indicates that only the blue color is available. The user visits a website of a shirt maker utilizing a personality profile that includes the user's TAG and the state which in this case is blue. The website recognizes the personality TAG of the user and the website is automatically transformed to conform to the user's personality profile. The user is matched with the product by matching the user's personality profile with the product profile and state.

4. Communication Applications:

The prior art communication methodology is to push the e-mails and other electronic communication to the user's communication device directly or by the intermediate step of a service provider and the associated servers, such as an e-mail server. This methodology has a number of inherent problems that require the user to take actions to screen and or block undesirable communication. The limitations of the prior art, result in over fifty percent of the e-mail communications to be spam as of the time of the present disclosure. The novel embodiments of present Matching Network system invention enable a new paradigm of electronic communication based on empowering the user for pulling the matched communications rather than having all of the communications pushed on to the user. The system of the present invention enables multiple users to maintain their own websites reflecting the user's plurality of public and private personalities. Said websites having the capability to be recognized or being able to recognize a Matchbot of the present invention and enabled to provide a stateful behavioral response specific to the Matchbot.

As an example, the user A is enabled to post various types of messages intended for User B in one or more private and public directories on User A's website. Similarly User B is enabled to post various types of messages intended for User A in one or more private and public directories on User B's website. The types of messages that could be posted are e-mail, voice mail, audio mail, private and public bulletin boards, image mail, video mail, data mail and others and the combinations thereof. User A and User B may each log onto the other's website and peruse the permitted directories maintained by one another. The only communication which is sent out by A to B and by B to A, such as by e-mail, is that there are a number of messages posted in a directory intended for each other, defining the categories and priorities of their postings. The Users A and B may visit the websites of the other, read the messages and download and save the messages to their own communication device or their own server if desired. The Matching Network system of the present invention ensures that in the event A and B are matched by one or more personality profiles; and matched as either individuals or as part of one or more groups then the message postings are deemed as a matched communication and classified as such. If there is no match between User A and User B, then the option of visiting the sites of each other is a matter of curiosity and is entirely up to the user's discretion. Communications in the future are likely to be highly bandwidth intensive comprising of image and video and the users have a need to limit and utilize the bandwidth primarily for intended and matched communications.

The matched communication methodology of the present invention ensures that the spam is limited, the communication bandwidth is used effectively, and there is no loss in precious time which is a rare commodity for the user. The foregoing significant improvements describe the method wherein the users still have to act on their own to pull the matched communications. However, in another embodiment of the present invention, the User A and User B may each deploy their own personalized Matchbot at a desired frequency and for a desired purpose, said Matchbot having the appropriate TAG and state, to traverse the Web and connect with the intended target website of each other to intelligently pull the messages of relevance and or index the messages for matching by the Match Engine using their own personal rules and algorithms at the communication device level, the Local Server level and or one or more of the Network Server level.

The processing power of the communication device and the servers and the wired or wireless connectivity is thus intelligently leveraged for intended and secure communication between matched entities and the unmatched entities are excluded or flagged. These novel embodiments of the Matching Network system of the present invention significantly alter the communication methods of the prior art and enable a new communication paradigm that puts the user in full control to efficiently and effectively communicate across the user's Personal Matching Network and the Group Matching Networks.

Another novel method of the present invention, for ensuring desired and secure communication is to enable matched communication from and between people in the User's personal matching network based on degrees of connectivity. The communications such as e-mail are sorted and enabled for delivery or for pulling based on the degree of connectivity. The Personal Routing Protocol PRP enables the sorting and screening. As an example the communications to the User from other users that are connected at the first degree level is easily enabled and prioritized as Level 1, the communications from the individuals that are at the second degree level of connectivity is Level 2 and so on to Level N communications. The ability for the User to block communications from individuals within the level or from any level is enabled. The firewalls and filters for secure and desired communications are thus based on the level of connectivity across personal and group networks and implemented by means of the Personal Routing Protocols, PRP and Group Routing Protocols, GRP.

The Personal Relations Management, PRM and the Group Relations Management, GRM software enable the management of the communications enabling the user to communicate efficiently with a large and growing number of matched contacts and potential matches. The Matching Network system of the present invention also enables a large number of levels of contact with users any where in the world, said users being separated by one degree or N degrees of connectivity, said users communicating in same or different languages, said users being matched by one or more personality profiles, by utilizing the processing power of the communication device by itself and or in conjunction with the local or network servers to execute language translation to facilitate efficient communication and collaboration.

In the prior art the web pages, e-mail and other textual content is in HTML format which lends itself for deceptive communication. The present invention enables textual content in HTML format to be automatically converted to XML format for screening purposes by the Matchbot and back to HTML. The Matchbot screens by using the rules and the defined sentence structure, word directory selected by the user. This enables tracking of content that is offensive or misleading and further enables delivery or viewing of content that meets the user's rules. Further the Matchbot is enabled to index web pages and the content of web pages that meet the match criteria.

Figure 12:
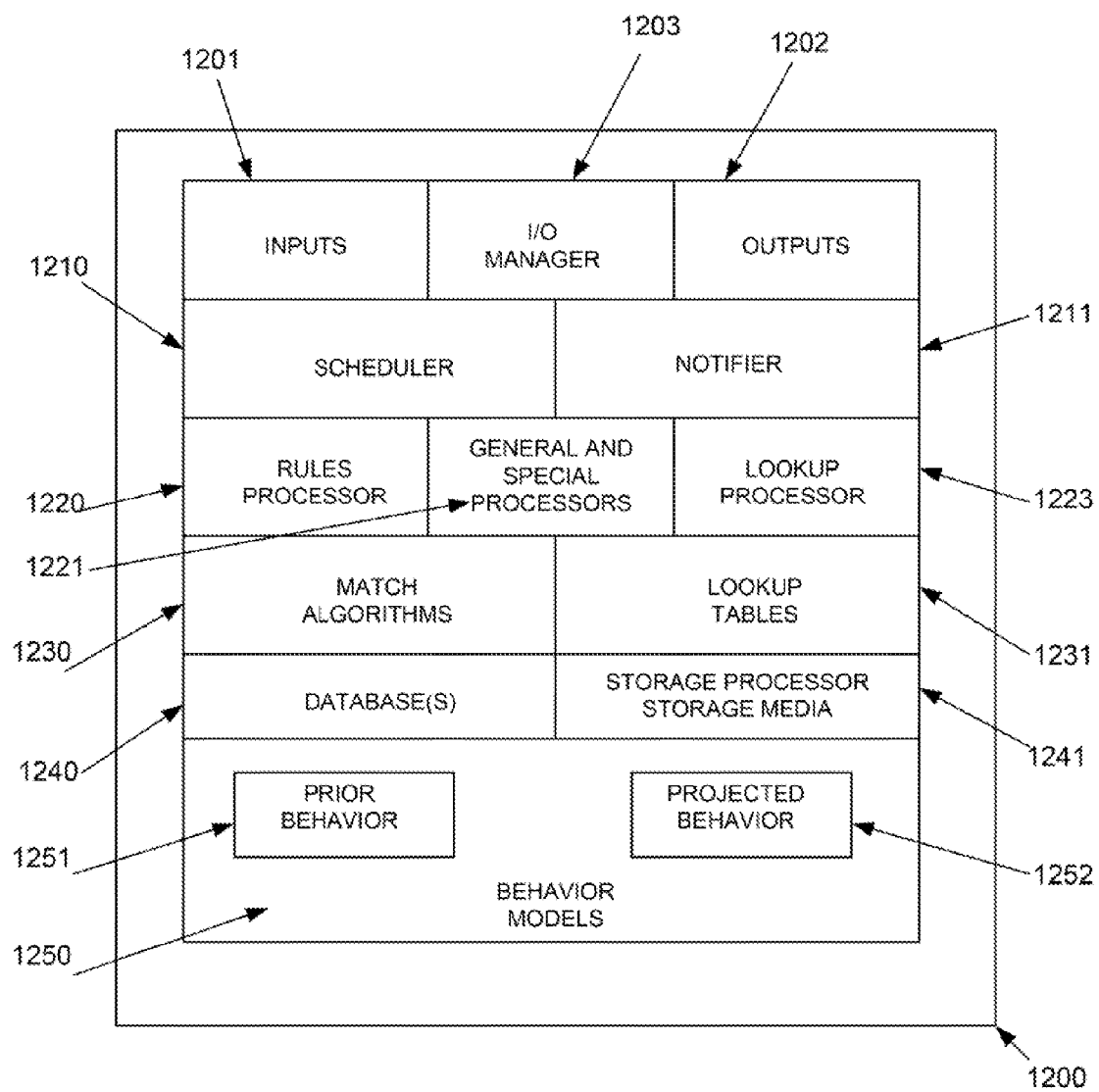
FIG. 12 shows the configuration of the Match Engine consisting of the input/output, I/O Manager Block, the Scheduler Block, Rules Processor Block, Lookup Tables Block, Lookup Processor Block, Processor Block comprising one or more general purpose and special processors, Database Block comprising one or more databases, Storage Block and the Behavior Model Block. The figure is for illustrative purposes and is not to be construed as limiting in scope.

FIG. 12: FIG. 12 shows an embodiment of a Matching Network system of the present invention showing the Match Engine and the methods by which the Match Engine recognizes and performs the matching. Referring now to the FIG. 12, the Match Engine 1200 is shown comprising of Inputs 1201, Outputs 1202 and I/O Manager 1203. The inputs to the communication device and or the servers may be in one or more protocols which are formatted and presented to the Match Engine by the I/O Manager. The Scheduler, 1210 manages and schedules different requests for matching. The Notifier, 1211 manages the communication with other functional blocks within the server/communication device and or external to the communication device. The Rules Processor(s) 1220 is a special processor to enable the rules defined by the user to be utilized in the match process in conjunction with other databases and algorithms. The General Processor(s), 1221 performs a multiplicity of processing tasks internal to the Match engine and or external to the Match Engine. The Lookup Processor(s) enable the fast lookup of information such as personality profiles and other archived information that needs to be used frequently in the match process being executed at a given time. The Lookup Tables, 1231 contain information that is needed frequently or for special purposes. The Algorithms, 1230 are designed to determine the best fit for various match criteria and are designed to fit the personality needs of the user. The Database(s) 1240 archive the information and enable efficient retrieval in conjunction with the Lookup Tables and the Lookup Processor. The databases are maintained locally at the communication device level and or on a storage area network using the Storage Media and Storage Processor 1241. The Behavior Models 1250 comprises of Prior Behavior 1251 of the User and in addition the behavior of the User in relation to other users and the behavior of other users in relation to the User; and Projected Behavior of the user based on various Bayesian prior history models, game theory and other situational analyses based on the personality profile of the user and the risk tolerance indicated by the user for that particular profile. The user is enabled to deploy a number of computer models to determine a perfect match and or determine varying degrees of a match. The figure is for illustrative purposes and is not to be construed as limiting in scope.

The Matching Process utilizing the Match Engine is illustrated with the following process. Other combination of matching process utilizing the embodiments of the present invention are possible and the following process explained herein for illustrative purposes is not to be construed as limiting.

Configuration

1. The user is described by one or more private and public personality profiles; and an associated rules/instruction set.

2. The Personality Profile may exist as a fully compiled descriptive set and or consist of one or more personality profile components which when compiled generate the personality profile. The full profile and or the individual personality profile components are encrypted and stored in a designated location, such as the communication device, CD and or may reside on the network on one or more servers. The compilation may take place in the designated location specified by the user. The objective of deconstructing and dynamically reconstructing/compiling is to provide a high degree of security.

3. The personality profiles are stored in the Personality Profile Data Base.

4. The Personality Profile Data Base is resident on the Communication Device, CD and or the appropriate Local Server, LS, the Network Server, NS, the Escrow Server ES or the Match Site. The user retains the discretion on where to maintain the personality profile database and the permissions.

5. The Match Engines of varying capabilities are resident on the communication device and or the network servers.

6. The Match Engine comprises of the Rules Processor but in certain configurations the Rules Processor is enabled to be external to the Match Engine.

Enabling the Personality Profile and the Personality Profile TAG

7. The Personality Profile and its components are for example described in XML, extensible markup language format. Other implementations using other software languages are possible.

8. Additionally, the personality profile is characterized by the TAG that allows classification by its type to allow easy and speedy recognition by the Match Engines, the Match Sites, Websites, Search Sites and the Servers and other communication devices.

9. The personality profile is enabled with a plurality of States further describing one or more purposes with the ability to hold the State for a designated period of time or purpose.

10. The TAG is described in XML or other software conforming to a generally acceptable recognition protocol or is written such that different protocols are enabled to interpret independently.

Matchbot

11. The User generates a Query for information or transaction using a Web Browser. The present invention anticipates non Browser applications that include voice based uses.

12. The Query is associated with a user's private or public personality profile. A quick choice, for example from a pull down menu is enabled to choose a personality profile or a default personality profile is enabled. Additionally, the appropriate personality profile is automatically selected based on contextual awareness, recognition of other communication devices/servers in the communication loop, location, language and other factors.

13. The Query is activated manually by the user who is communicating via the Internet. Alternately the query is attached to a Matchbot. The Matchbot is enabled additionally with the desired personality profile. The Matchbot implementation is enabled in software. The Matchbot seeks and delivers matched data or matched data sets from ordered and or random data.

14. The Matchbot is launched to seek specific targeted information that meets the personality profile and user defined rules to enable matching by the Match Engine.

15. The Matchbot is enabled to be launched from a particular communication device and or a server. The origin and destination of the Matchbot need not be the same. The destination of the Matchbot depends on the node in the network where the matching process by the Match Engine takes place.

16. The Matchbot is launched and targeted at one or more specific websites and or enabled to find target websites that are likely to contain the desired information. Additionally the websites have their own personality profiles and Tags for easy recognition by the Matchbot.

17. The Matchbot is configurable with one or more target URL or IP addresses and one or more return addresses. The Matchbot is enabled to be encrypted.

18. Matchbot is enabled for a specific purpose and mission. The Matchbot may be launched at a desired time or may be launched periodically. Multiple Matchbots may be launched by the User or the Website.

19. The Matchbot itself is enabled to determine one or more levels of relevancy by comparing the target TAG, the coded personality profile/instructions before presenting the data to the Match Engine.

20. Users have the ability to modify and adjust their match criteria and present the results in a graphical user friendly format in conjunction with the communication device interface and the match engine.

21. The matching is enabled via the information acquired in digital form, or alternately determined, intuitively by people themselves. The user is enabled to narrow or relax match criteria and iterate through a number of potential matches.

22. The Matchbot navigates the web looking for matching websites, matching information, matching products and matching services and delivers the matched data to the communication device or the server, or alternately delivers data that meets certain matching criteria which then is analyzed further and matched by the Match Engine located on the communication device and or the Intranet/Internet servers. In the special case where there is no match requested or no matching parameter designated, the Matchbot still is enabled with personality profiles, TAG and states and in this event the Matchbot is configured for intelligent searching. The Matchbot is also enabled with additional coding in the TAG and the states to be action oriented and empowered by the user to execute designated transactions upon determining that a desired match exists.

23. The present invention enables matching of the user's request for information, products and services by the means of the Matchbot and the Match Engine. The Matchbot is characterized by one or more personality profiles, said personality profiles matching the personality profile of the user. The Matchbot in addition is characterized by the TAG and is capable of holding one or more states. An example of the state is that the Matchbot is enabled to exist for one or more time periods, or is enabled for a specific purpose or is launched at a desired frequency from the communication device and or the server.

The Match Engine

24. The Match Engine processes the data for relevancy as defined by the user. The user is enabled to select one or more matching algorithms. Or select default algorithms resident on the Match Engine. The Match Engine enables transmission of meta-data and control data between two or more entities that need to communicate or perform computations. The Match Engine application programming interfaces specify the format of the meta-data. This syntax is made as an open specification such that a variety of systems may process the meta-data format. A language such as XML, extensible markup language is used to specify this meta-data format. The storage of the meta-data or control data is enabled in one or more application specific data bases on a Storage Processor for efficient matching. The Storage Processor and storage media, 1241 is configured to be part of the Match Engine or external to the Match Engine on a storage area network and or other local area or network server. The Match Engine meta-data is stored in a user specific data base. The meta-data is grouped together such that it forms a key that can be provided to a content addressable memory. These keys are passed to a Rules Processor for rule based processing and matching 25. The Match Engine utilizes the user defined/selected personality profiles, behavior models, rules and algorithms to determine a match. The Rules Processor serves as a content addressable memory and allows for rules to be codified. A relationship between various parameters may be programmed into the Rule Processor. The Rules Processor is intended to be normally part of the Match Engine and in certain instances is configured to be on the communication device, the local area server or the network servers. The Rule Processor may operate with rules that are ordered from most specific to least specific. The intention is to efficiently facilitate the most specific match. A default entry is enabled in the Rule Processor. A set of parameters is input to the Rule Processor causing the appropriate processing to be performed for that specific rule to derive the most specific output for a match. The rule is expressed in binary form or in a string format.

26. The Match Engine enables the discovery and use of wired or wireless applications that are best suited and matched to the user. The Match Engine is used in the adaptation of the wireless communication protocols. One or more users communicating by wireless means maintain a behavioral model and finite state machine. Since the wireless medium are constantly changing in terms of noise parameters and channel characteristics, a behavioral model is employed to respond to a variety of dynamic real-time stimuli. Each user that is communicating maintains a profile that is determined by the type of mobile device, geographical location and the specific application at a given time. The application profile describes the application's communication requirements. These parameters are expressed at a high level and translated at lower layers into specific operations. The state of the wireless protocol is changed, based on the wireless application profile. Upon a change to the wireless communication protocol, the Match Engine facilitates the negotiation of new communication parameters. As an example, these parameters may indicate that the power level should be increased so as to overcome the higher noise seen at the receiver. The negotiations between the two communication devices are facilitated by the Match Engine. The Match Engine enables adaptable wireless networking applications for mobile devices and intelligent appliances.

27. The Match Engine enables the discovery of wireless devices/Intelligent Appliances and the appropriate service offering by the wireless service provider. The Match Engine enables service providers to offer customized services to wireless users in a home or office environment through behavioral modeling and matching. As an example, if a personality profile resident on a wireless enabled laptop identifies a particular user as an executive, then requests to the wireless printer may be queued in such a way that the executive's profile places him into an expedite queue that will be processed at a higher priority. Alternatively, the wireless enabled primer may use the Match Engine Infrastructure to behave in manner such that it assigns no special weight or a higher weight to a user based on the personality profile. The modeling of the user and the behavior of both the client device as well as the printer leverages the Match Engine to provide an enhanced wireless experience.

28. As an illustrative example the Match Engine is configurable to serve the needs of the healthcare industry by enabling the matching of symptoms and diseases. Users are enabled to match their particular symptoms with symptoms aggregated among thousands of other users to determine similar patterns. The Match Engine is used in the behavioral modeling of the user and the disease to determine if a match exists. The Match Engine has utility for similar applications not specifically enumerated herein.

29. The Match process and Match Engine of the present invention characterize the User, the Matcher who is the requester and the target which is the Matcher. Unlike the search based and Search Engine processes of the prior art, the match based processes and the Match Engine enable enhanced utility for the Internet user.

The novel embodiments of the present invention taken alone or in combination are applicable for match based processes, search based processes, and the combination of search and match based processes.

Figure 13:
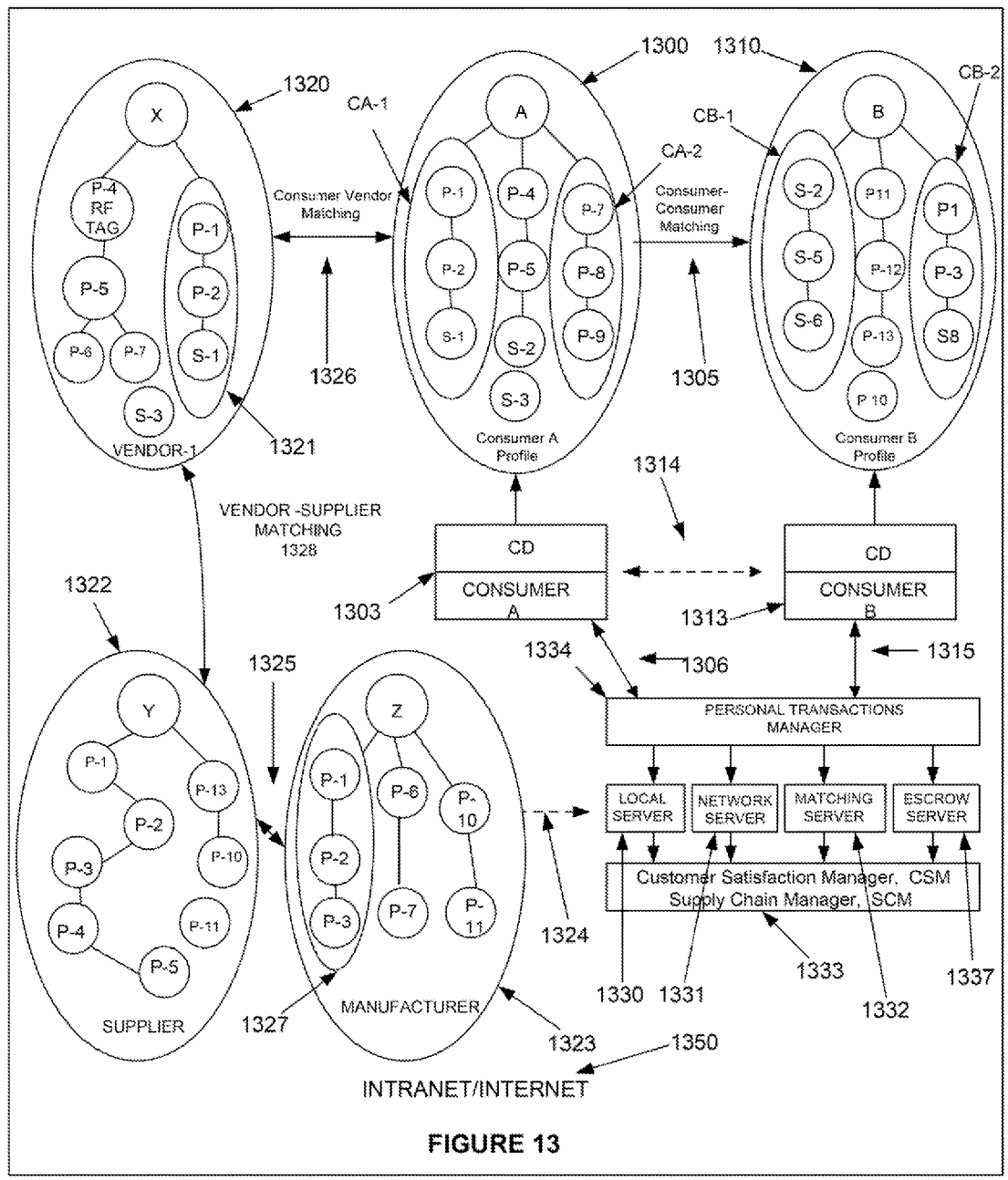
FIG. 13 shows the consumer to consumer matching, the consumer-to vendor matching, the vendor to supplier matching and the supplier to the manufacturer matching.

FIG. 13: FIG. 13 shows the novel method of the present invention for enabling personal transactions management by the consumer and consumer satisfaction management by the vendor. FIG. 9 and other figures illustrated the process for building connectivity networks for individuals and groups which are by analogy capable of being extended to products and services. The teachings of FIG. 13 when viewed in a standalone manner and or combined with other figures of the present invention enable the user and the provider to discover product service relationships by utilizing the personality profiles of the user in relation to the user's purchasing patterns. As an example the user that purchases a tooth brush is likely to need tooth paste; and it is likely that the user would also need the services of a dentist. If the user purchases a particular brand of tooth brush then it is likely that the user would prefer the same manufacturer for the tooth paste.

The Personality Transactions Management, PTM, software enables the consumer to discover products and execute transactions based on the user personality profiles and the product personality profiles. The Customer Satisfaction Management, CSM, software relates the products and services desired by the user, said user being characterized by personality profiles and behavior models and said products and services being similarly characterized; such that the user who is the consumer is able to receive satisfactory service from the vendor by means of matching the requirements of the consumer and the ability of the vendor to provide. The PTM and CSM software is enabled to reside at the communication device level and or on the local or network server. The Matchbot is configurable to perform matched discovery of the partial or full range of products and services which the vendor/website is able to deliver and automatically either deliver the information or execute the matched transaction desired by the user.

Now referring in detail to FIG. 13 the consumer A, 1300 and consumer B, 1310 are enabled to have one or more consumer profiles and utilize communication devices 1303 and 1313 respectively. The consumer A selects a consumer personality profiles from a plurality of profiles to execute a transaction. In this case the consumer is interested in buying the product P-4 which in the profile of A is not related to other products or services. However, the products P-1, P-2 and the service S-1 are related and grouped and generally require a single execution. Vendor-X provides a product-service group, 1321 consisting of the specific group CA-1, desired by the consumer A. As an example, the product/service group 1321 provided by the vendor and the product/service group CA-1 in this example may consist of toothpaste, P-1, toothbrush P-2 and dental service S-1. The matching between the consumer A and Vendor X is negotiated by the means of 1326. Consumer A and Consumer B are enabled to collaborate for purchases by the matching process of 1305. Consumer B does not match with Vendor-X as the vendor does not offer the groupings CB-1 or CB-2 desired by consumer B. However they may share products by executing joint purchases.

Vendor-X is enabled to match with the supplier Y by means of the Vendor to Supplier matching, 1328, process to determine the reordering or availability. In this scheme the vendor and the supplier have a real time awareness of the consumer's personality behavior and purchasing patterns. The Supplier Y is enabled to match with the manufacturer via the matching process 1325, to alert the manufacturer to ship or manufacture. The manufacturer, 1323, is enabled to deliver products as individual items or in groups, such as 1327. The communication paths are wired or wireless. The Personal transactions Manager, PTM, 1334 resides at the communications level and or the server level. The Customer Satisfaction Manager, 1333 resides at the vendor server level and or the manufacturer's server level.

The present novel invention enables the management of the entire supply chain based on consumer profiles and consumer behavior models enabling better real time management of inventory and customer responsiveness. The Supply Chain Management, SCM software resides on the vendors and the manufacturer's servers and is enabled to model the consumer demand in detail and or in the aggregate based on personality profiles of the consumer, the personality profiles of the vendor and the personality profiles of the manufacturer. In addition each node of the supply chain is characterized by the personality profiles and behavior models.

Figure 14:
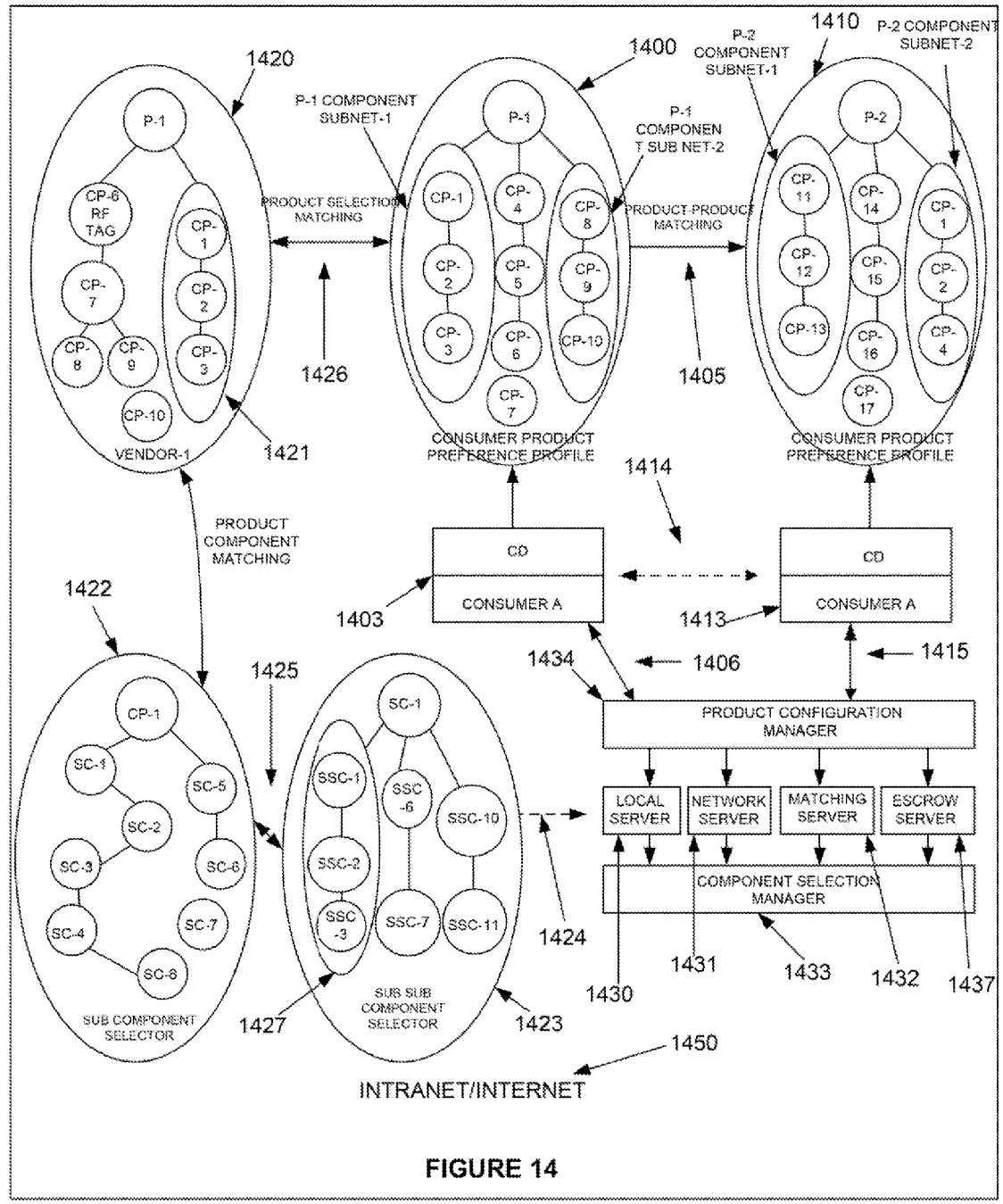
FIG. 14 shows the feature wherein the products/services are characterized by personality profile type attributes thus enabling the consumer to configure and personalize products.

FIG. 14: The novel embodiments of the present invention which enable electronic commerce are described by referring to the FIG. 14. As an example, the consumer A is evaluating two different products and wishes to configure the products by fully understanding the relationship between the user's personality profile and the personality profile like description of the products. The user A has a personality profile, 1403 for product P-1, 1400; and the personality profile 1413 for product P-2, 1410. The user utilizes the communication device, CD. The products P-1 and P-2 are compared by the user, via the product to product matching process 1405. The communication between the user and the servers is by the path 1406 and 1415. The Product Configuration Manager, PCM, 1434 enables the user to match various components and sub components as the user determines the best configuration that matches one or more of the user's personality profiles and the inter relationships between one or more products that the user wishes to purchase. The product P-1 comprises of a number of components and sub components which may be selected to form a fully personalized product configuration that meets the user's personality profile. The Vendor-1 offers the product and enables the configuration. User A wishes to configure the product P-1 with components CP-7, CP-10, CP-8 and the component grouping indicated by P-1 component subnet-1. The Vendor-1 offers the desired components CP-7, CP-10, CP-8 and the grouped subnet 1421 which is identical to the grouped subnet desired by the user. The user is now enabled to model the full product P-1 since all the components are modeled. This ability is extended to the sub component level since the component is comprised of one or more sub components SC-1, SC-2 and so on, said combination being similar to the subnet such as 1422 which forms the component CP-1. The subcomponent SC-1, in turn comprises of sub-sub components, SSC-1 SSC-2 and SSC-3 which form a sub sub net 1427 and other sub sub components. This methodology enables the ability to fully configure the product based on consumer profiles, behavior models and the attributes of the product which are described down to the sub component level with personality profile like structure. The Component CP, as illustrated for CP-6 is enabled to have a RF-Tag. The Product, P-1, the components CP, the sub components SC and the sub-sub components SSC are enabled to be configured with a RF-Tag for recognition by the mobile communication device. The RF-Tags are in turn enabled to contain the coded information which describes the personality profile type attributes of the item. The communication device is configured with the ability to send and receive signals from the RF-Tag on one or more channels of communication, as an example utilizing the MMTR, to enable personalized product configuration and transactions. The foregoing methods for configuring and personalizing the products/services are enabled by the Product Configuration Manager and the Component Selection Manager which reside at the communication device level and or the local/network server level.

The foregoing description of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the present invention, and its practical application, to thereby enable others skilled in the art to best utilize the present invention and various embodiments, with various modifications, as are suited to the particular use contemplated. It is intended that the scope of the invention be defined by the Claims appended hereto and their equivalents.

We claim:

1. A social network system comprising:
at least one communication device; and
at least one server comprising an application for storing profile information for one or more individuals, storing actions of one or more individuals, and for storing relationships between one or more individuals;
wherein the communication device and the server interact to allow an individual communication device user to maintain a plurality of personality profiles comprising public personality profiles and private personality profiles,
wherein the personality profiles have a dynamic number of states,
wherein the communication device and the server interact to allow forming one or more groups comprising individuals,
wherein the communication device and the server interact to allow the group to maintain one or more personality profiles,
wherein the server maintains personality profile fields that are associated with a permission level, and
wherein relationships between a plurality of users are defined by degrees of connectivity, wherein a first user profile is connected to a second user profile separated by one or more degrees of connectivity, wherein a third user profile is connected to the second user profile separated by one degree of connectivity, wherein text and images from the third user profile are presented to a second user, wherein text and images from the third user profile are presented to a first user when the first user and a third user both approve of a connection.

2. The social network system of claim 1, further comprising a web search engine configured to search the content of multiple websites across the Internet and display web search results relevant to the profiles of members of the social network.

3. The social network system of claim 1, further comprising a match engine, wherein the match engine allows for the discovery and use of users profiles or products that are best suited for and matched to the user by searching for content across a distributed network of web sites.

4. The social network system of claim 1, wherein a predictive logic is used to send product advertisements to a user based upon past Internet search history.

5. The social network system of claim 1, wherein the private and public personality profiles of a user are created based on data uploaded by a user and wherein private profiles are updated based upon private Internet search history and public profiles are updated based upon public Internet search history.

6. The social network system of claim 1, further comprising a question log, answer log, and personality profile generator for creating personality profiles wherein a user ascribes weights to various questions and answers.

7. The social network system of claim 1, wherein a user, picture, and product are associated with an identifying TAG that is discoverable by web search engines.

8. The social network system of claim 1, wherein a user, web site or web page, and product or service have a plurality of personality profiles.

9. The social network system of claim 1, wherein the communication device and the server interact to allow consumer to consumer matching, consumer to vendor matching, vendor to supplier matching and/or supplier to manufacturer matching.

10. The social network system of claim 1, wherein a user can maintain different personality profiles and/or personality states.

11. The social network system of claim 1, wherein the user is characterized by a user behavior model.

12. The social network system of claim 1, wherein a behavior model characterizes and models the user based on the user's personality profiles and the actual history of the user in various prior interactions and/or transactions.

13. The social network system of claim 1, wherein a user behavioral model models the user's prior history and decision processes for future predictive behavior Including suggesting relationships.

14. The social network system of claim 1, wherein different web pages within a website are characterized by one or more personality profiles and the ability to hold a state for a specific user, wherein the website can recognize that users have distinctly different personalities and deliver web pages, website personalities, and/or website functionality that are matched to the needs of each user.

15. The social network system of claim 1, wherein users, websites, and products or services are characterized by personality profiles and behavior models to allow for matching of the users with the desired websites, products or services.

16. The social network system of claim 1, further comprising a personality profile creator, question and answer creators, a mutual ability to query and track answers, a matching engine, and personal or group relations management software wherein the system is configured for use in health care applications.

17. The social network of claim 1, further comprising a web search engine configured to search the content of multiple websites across the Internet and display web search results relevant to the profile fields of the first user.

18. The social network of claim 17, wherein the first user adds a connection between the first user profile and a first web site.

19. The social network of claim 18, wherein the third user adds a connection between the third user profile and a second web site.

20. The social network of claim 19, wherein the web search engine matches the second web site to the first user profile and displays the second web site through the web search engine.

21. The social network system of claim 1, wherein a second user can prevent the access of the first user to the third user profile through the second user profile by deleting the connection to the first user or the third user.

* * * * *